(12) United States Patent
Grossmann et al.

(10) Patent No.: US 8,743,214 B2
(45) Date of Patent: Jun. 3, 2014

(54) DISPLAY SCREEN FOR CAMERA CALIBRATION

(75) Inventors: Etienne Grossmann, Menlo Park, CA (US); John Iselin Woodfill, Palo Alto, CA (US); Gaile Gibson Gordon, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 13/105,226

(22) Filed: May 11, 2011

(65) Prior Publication Data

US 2012/0287287 A1 Nov. 15, 2012

(51) Int. Cl.
*H04N 17/00* (2006.01)
*H04N 17/02* (2006.01)

(52) U.S. Cl.
USPC ......................................................... 348/188

(58) Field of Classification Search
USPC .................................. 348/187, 188, 175, 176
See application file for complete search history.

(56) References Cited

U.S. PATENT DOCUMENTS

| | | | |
|---|---|---|---|
| 6,377,298 B1 | 4/2002 | Scheele et al. | |
| 6,760,483 B1* | 7/2004 | Elichai et al. | 382/241 |
| 7,733,404 B2* | 6/2010 | Zandifar et al. | 348/333.01 |
| 2002/0067855 A1 | 6/2002 | Chiu et al. | |
| 2004/0170315 A1 | 9/2004 | Kosaka et al. | |
| 2005/0207640 A1* | 9/2005 | Kim et al. | 382/154 |
| 2007/0091174 A1* | 4/2007 | Kochi et al. | 348/135 |
| 2008/0002041 A1 | 1/2008 | Chuang et al. | |
| 2008/0239327 A1 | 10/2008 | Bryll | |
| 2009/0161945 A1* | 6/2009 | Morgan-Mar et al. | 382/154 |
| 2010/0134634 A1* | 6/2010 | Witt | 348/181 |

OTHER PUBLICATIONS

M.D. Grossberg and S.K. Nayar, The Raxel Imaging Model and Ray-Based Calibration, International Journal on Computer Vision, vol. 61, No. 2, pp. 119-137, Feb. 2005.

L. Lu, F. Dong, D. Xia and G. Yao, A New Method for Improving Camera Calibration Precision, Proc. Intl. Conf. on Computer Application and System Modeling, 2010.

Z. Song and R. Chung, Use of LCD Panel for Calibrating Structured-Light-Based Range Sensing System, IEEE Transactions on Instrumentation and Measurement, V. 57, N. 11, 2008, pp. 2623-2630.

H. R. Tavakoli and H. R. Pourreza, Automated Center of Radial Distortion Estimation, Using Active Targets, Proc. Asian Conf. on Computer Vision, 2009, pp. 325-334.

* cited by examiner

*Primary Examiner* — Michael Lee
(74) *Attorney, Agent, or Firm* — Trop, Pruner & Hu, P.C.

(57) ABSTRACT

A system for determining one or more camera calibration parameters is disclosed. The system comprises a processor and a memory. The processor is configured to: a) provide a first pattern for display on a display screen; b) receive a first image from a camera viewing the display screen; c) provide a second pattern for display on the display screen; and d) receive a second image from the camera viewing the display screen. The relative position of the display screen and the camera are the same as when the first image was captured using the camera. The processor is further configured to determine an image location which is a projection of a known physical location on the display screen by using at least in part a first feature identified in the first image and a second feature identified in the second image and determine one or more calibration parameters based at least in part on the determined image location. The memory is coupled to the processor and configured to provide the processor with instructions.

25 Claims, 28 Drawing Sheets

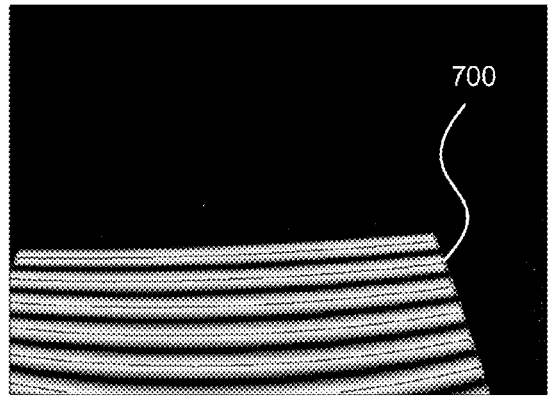 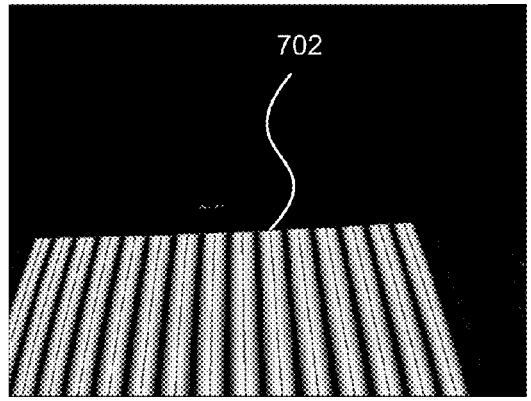
Figure 7A
Figure 7B
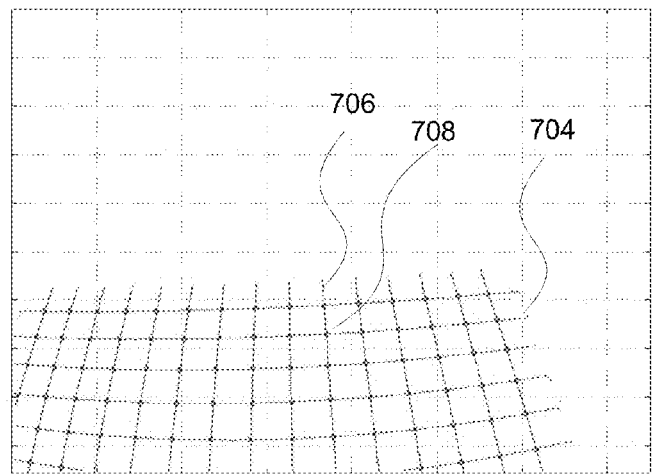
Figure 7C

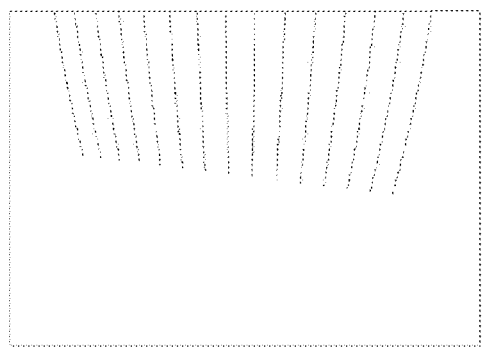
FIG. 9A1
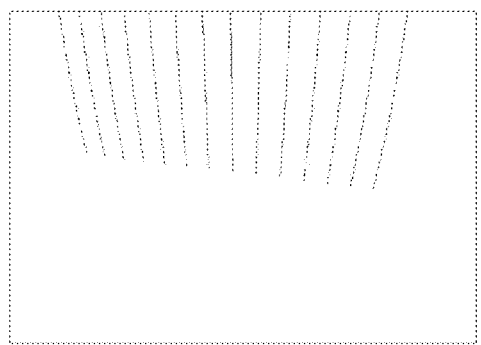
FIG. 9A2
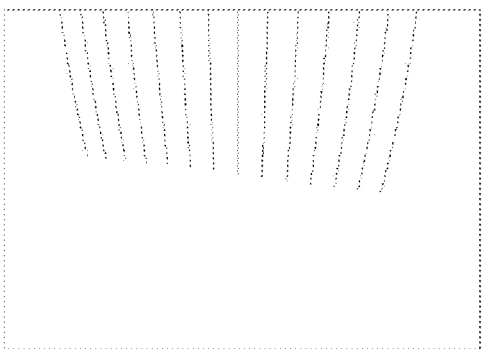
FIG. 9A3
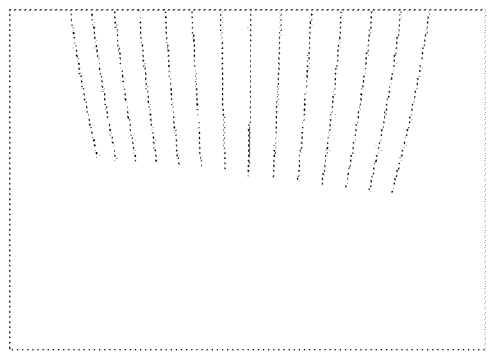
FIG. 9A4

DISPLAY SCREEN FOR CAMERA CALIBRATION

BACKGROUND OF THE INVENTION

Camera calibration is a critical step in a large variety of image processing applications. Most products which involve one or more cameras and perform image processing or analysis require a camera calibration step during manufacturing. It is desirable to be able to calibrate the camera accurately, as quickly as possible, while also requiring as small an area on the manufacturing floor as possible.

In traditional camera calibration methods, the camera(s) views a calibration target from one or more different positions. Calibration targets are rigid objects that contain known visual patterns that are possible to locate with great accuracy in images. Some approaches require the camera to view a planar, or two dimensional (2D), calibration target from many (four or more) different positions and distances. The planar target is often created by printing a pattern on a high resolution printer and then mounting it to a flat surface. The target contains fiducial points, such as checkerboard intersections, for which the relative three dimensional (3D) locations are precisely known. Other methods use a non-flat or 3D calibration target, in which case a single view is sufficient. Positioning the camera once is preferable for manufacturing since it is faster and enables a simpler manufacturing floor layout and work flow. However, 3D calibration targets typically require great manufacturing accuracy to place the target fiducials at precise locations, resulting in a high cost. Detecting the target features can also be more difficult on a 3D target.

BRIEF DESCRIPTION OF THE DRAWINGS

Various embodiments of the invention are disclosed in the following detailed description and the accompanying drawings.

FIGS. 7A and 7B illustrate embodiments of images of multiple calibration patterns.

FIG. 7C is a diagram illustrating an embodiment of a virtual composite of features, comprising the curves shown in FIG. 7A and FIG. 7B.

FIGS. 9A1, 9A2, 9A3, 9A4, 9B, 9C, and 9D illustrate embodiments of features obtained in the process for achieving denser features.

DETAILED DESCRIPTION

Figure 1:
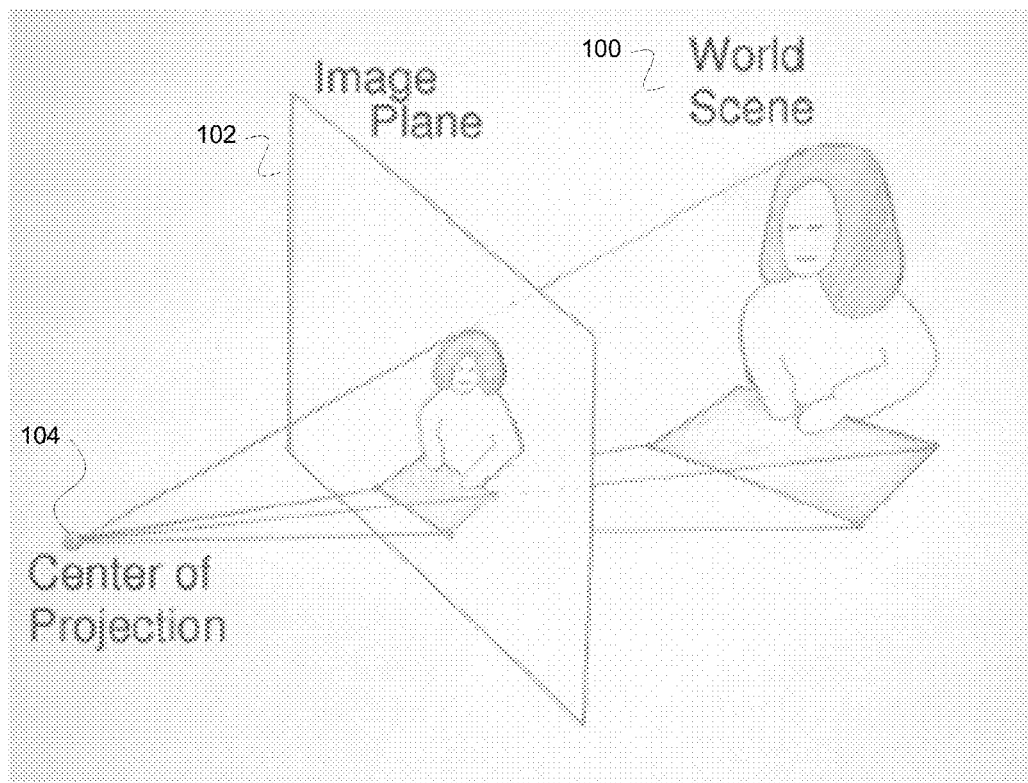
FIG. 1 is a diagram illustrating an embodiment of camera functionality.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. The order of some steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining one or more camera calibration parameters is disclosed. The system comprises a processor and a memory. The processor is configured to: a) provide a first pattern for display on a display screen; b) receive a first image from a camera viewing the display screen; c) provide a second pattern for display on the display screen; and d) receive a second image from the camera viewing the display screen. The relative position of the display screen and the camera are the same as when the first image was captured using the camera. The processor is further configured to determine an image location which is a projection of a known physical location on the display screen by using at least in part a first feature identified in the first image and a second feature identified in the second image and determine one or more calibration parameters based at least in part on the determined image location. The memory is coupled to the processor and configured to provide the processor with instructions.

A system for computing one or more calibration parameters of a camera is disclosed. The system comprises a processor and a memory. The processor is configured to provide a first object either a) marked with three or more first object fiducial points or b) capable of displaying three or more first object fiducial points. The three or more first object fiducial points have known 3D first object fiducial point positions in a first reference frame associated with the first object. The processor is further configured to provide a second object either a) marked with three or more second object fiducial points or b) capable of displaying three or more second object fiducial points, wherein the three or more second object fiducial points have known 3D second object fiducial point positions in a second reference frame associated with the second object. The processor is further configured to place the first object and the second object in a fixed position such that the 3D first object fiducial point positions and the 3D second object fiducial point positions are non-planar and to receive one or more first camera images from a first camera viewing the first object and the second object. The processor is further configured to locate a first set of projections of the three or more first object fiducial points and the three or more second object fiducial points in each of the one or more first camera images and compute the set of 3D positions in a common frame of reference of the three or more first object fiducial points and of the three or more second object fiducial points based at least in part on the first set of projections. The processor is further configured to receive one or more second camera images from a second camera viewing the first object and the second object and locate a second set of projections of the three or more first object fiducial points and the three or more second object fiducial points in each of the one or more second camera images. The processor is further configured to compute one or more calibration parameters of the second camera using at least in part the second set of projections and the set of 3D positions of the fiducials in the common reference frame. A memory coupled to the processor and configured to provide the processor with instructions.

Determining one or more camera calibration parameters is disclosed. A first pattern is provided for display on a display screen. A first image is received from a camera viewing the display screen. A second pattern is provided for display on the display screen. A second image is received from the camera viewing the display screen, where the relative position of the display screen and the camera are the same as when the first image was captured using the camera. An image location which is the projection of a 3D point with known physical location on the display screen is determined, at least in part by using a first feature identified in the first image and a second feature identified in the second image. One or more calibration parameters are determined based at least in part on the computed image location.

Computing one or more calibration parameters of a camera is disclosed. A first object is provided which is either a) marked with three or more first object fiducial points or b) capable of displaying three or more first object fiducial points, where the three or more first object fiducial points have known 3D first object fiducial point positions in a first reference frame associated with the first object. A second object is provided which is either a) marked with three or more second object fiducial points or b) capable of displaying the three or more second object fiducial points, where the three or more fiducial points have known 3D second object fiducial point positions in a second reference frame associated with the second object. The first object and the second object are placed in a fixed position such that the 3D first object fiducial point positions and the 3D second object fiducial point positions are non-planar. One or more first camera images are received from a first camera viewing the first object and the second object. A first set of projections of the three or more first object fiducial points and of the three or more second object fiducial points in each of the one or more first camera images are located. The set of 3D positions, in a common reference frame, of the three or more first object fiducial points and of the three or more second object fiducial points are computed based at least in part on the first set of projections. One or more second camera images are received from a second camera viewing the first object and the second object. A second set of projections of the three or more first object fiducial points and the three or more second object fiducial points are located in each of the one or more second camera images. One or more calibration parameters of the second camera are computed using at least in part the second set of projections and the set of 3D positions of the fiducials in the common reference frame.

Determining a transformation from coordinates in one reference frame to coordinates in a different reference frame is disclosed. A first pattern is provided for display on a first display screen. A second pattern is provided for display on a second display screen, where the relative position of the first display screen and the second display screen remains fixed. An image is received from a camera viewing the first display screen and the second display screen. A transformation from coordinates in one reference frame to coordinates in a different reference frame is determined between the first display screen and the second display screen.

Using two or more flat calibration targets, possibly display screens, to create an inexpensive 3D calibration target is disclosed. In some embodiments, the monitors or display screens comprise liquid crystal display (LCD) monitors. A mechanism is disclosed to accurately learn the relative position of the LCD monitors once they are rigidly mounted. Displaying a sequence of one or more patterns on the monitors containing calibration features is disclosed that enable accurate camera calibration from as few as one viewing position of the camera with respect to the monitors. The sequence of patterns, as described below, also allows for greater calibration accuracy than could be possible from a non-active calibration target. Greater accuracy is achieved by 1) location of a larger number of features for the same target dimensions, 2) location of features closer to the image edges (improving coverage of images by features), and 3) straightforward mechanisms to assist with feature correspondence in multiple camera calibration (e.g., stereo cameras). In some embodiments, feature localization algorithms are simplified with the active target methods disclosed, which offer an advantage for system robustness and maintenance.

In some embodiments, once the features have been detected in the camera images, the computation of the camera calibration parameters based on this data is performed.

Most work on calibration using flat display screens use the screen to display a fixed checkerboard calibration pattern. This provides a fixed target which varies from the printed version only by improved and known planarity statistics. The display or monitor manufacturers measure and publish the planarity statistics of the monitor. In one case, a camera-projector pair is calibrated using the screen in a minimally active fashion, in the sense that the screen is blanked after having captured checkerboard images such that the screen is used as a projection surface. In another case, the display is used only to show a fixed target, which does not improve upon feature extraction robustness, density, or coverage over just using a static target.

Additional work has been done which uses an active LCD monitor target for estimating the center of distortion of a camera. Two intersecting lines are displayed simultaneously on the LCD. This pattern is moved by the calibration algorithm while the linearity of the projections of the lines is evaluated to estimate of the center of distortion in the image. The advantage of the screen display of the target pattern in this case is the efficiency of automatically displaying a large number of stimuli at small differences in physical location, without requiring the camera or a printed target to be moved. Unlike the disclosed, the feature analysis is otherwise identical to what would be done with a printed target displayed at many locations in the field of view.

In another case, an LCD panel is used to calibrate an integral image camera. For this case, the camera is placed successively in two positions. In each camera position, the screen pixel pointed at by each camera pixel is determined. The calibration patterns comprise 20 (twenty) vertical and horizontal square waves. Line features are not localized in the captured images. This method requires that the number of calibration patterns be at least the logarithm in base two of the number of pixels of the camera. In contrast, one embodiment of the disclosed only requires two calibration patterns. In contrast, one embodiment of the disclosed localizes linear image features in the images.

FIG. 1 is a diagram illustrating an embodiment of camera functionality. In the example shown, three dimensional world scene 100 is imaged onto image plane 102 in the same manner as a perspective camera. In a perspective camera, light travels in straight lines called optical rays, from a point called the center of projection, to a world point, intersecting the image plane in the projection, or image, of the said world point. Perspective projection preserves some world physical properties, such as alignment: the image of a 3D line that does not include the center of projection is a 2D line in the image. For example, a perspective camera generates an image as if world scene 100 is observed from point 104.

In many computer vision or image analysis algorithms, it is required to know, in a reference frame associated with the camera, the 3D direction of the optical ray that corresponds to each image pixel. When this information is available, one says that one has a calibrated camera.

Figure 2A:
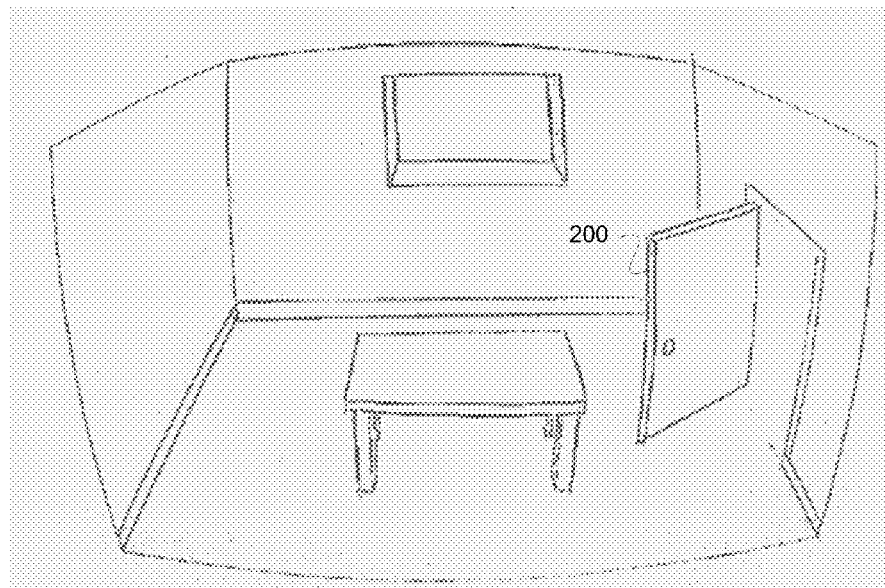
FIG. 2A illustrates an embodiment of an image as it is produced by a camera: world lines appear as curves.

FIG. 2A illustrates an embodiment of an image as it is produced by a camera: world lines appear as curves. In the example shown, the camera is a poor approximation to a perspective camera. Note that the wall edges and the door edges appear as curves. For example, door edge 200 appears to bow to the right in the middle.

Figure 2B:
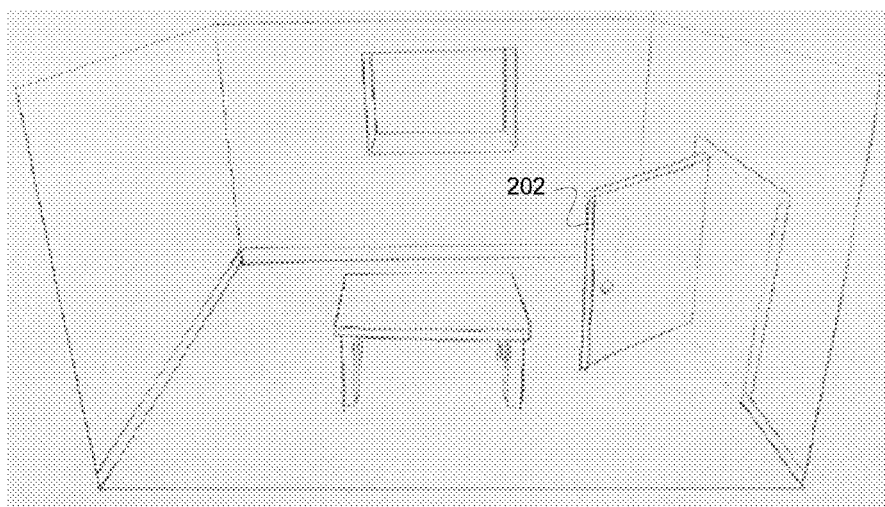
FIG. 2B illustrates an embodiment of a rectified image produced by a calibrated camera: world lines appear as lines.

FIG. 2B illustrates an embodiment of a rectified image produced by a calibrated camera: world lines appear as lines. In the example shown, the camera is a good approximation to a perspective camera, in the sense that one knows the 3D direction pointed by each pixel. For example, the left and right edges of the image are separated by 80 degrees. Door edge 202 appears as a straight edge without bowing.

In the example shown in FIG. 2A, an image is shown produced by a camera: one sees straight lines in the world (e.g., the leftmost edges of the window) project as curves. Because the camera is calibrated, one knows the 3D direction of each pixel's ray and one can rectify the image (e.g., put each pixel back to the place it would occupy in a perspective image), resulting in a good approximation of the perspective projection image as shown in FIG. 2B. In addition to looking better, rectified images, and more generally calibrated cameras, are a requirement for many powerful computer vision algorithms.

For example, a calibrated stereo camera comprises a left and right camera that have been calibrated such that they both generate a perspective image and allows the computation of metric world distance.

Figure 3A:
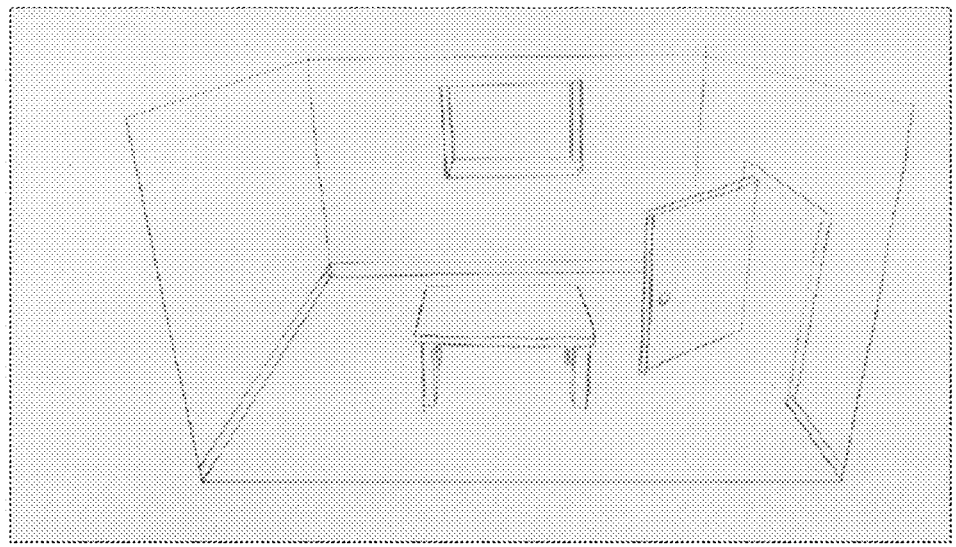
FIGS. 3A and 3B are images illustrating an embodiment of a pair of rectified images produced by a calibrated stereo camera.
Figure 3B:
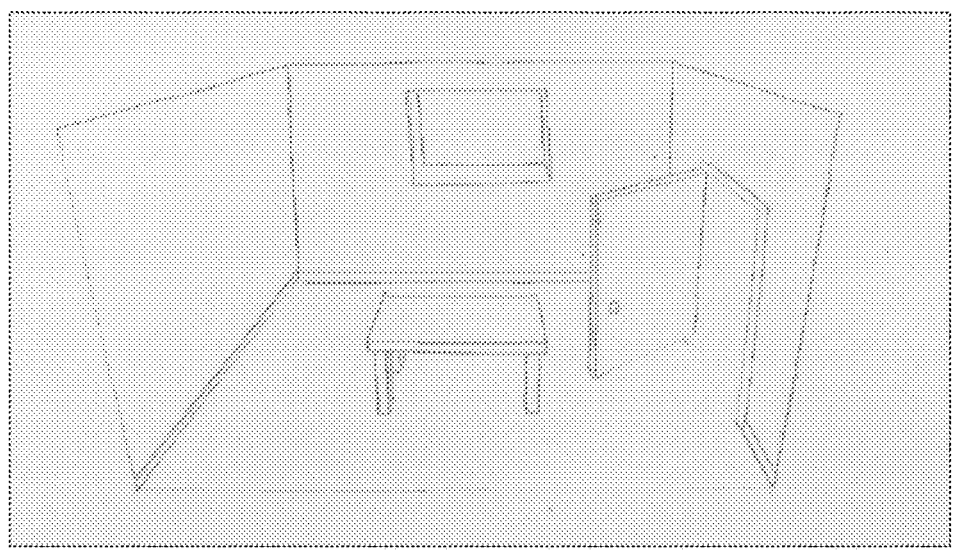

FIGS. 3A and 3B are images illustrating an embodiment of a pair of rectified images produced by a calibrated stereo camera. In the example shown, in addition to being good approximations to perspective cameras, the image pair is virtually aligned in the sense that the projection of a given 3D scene point lies at the same height (row) in both the left and right images of the stereo pair.

In practice, calibrating a camera means estimating values that represent physical and optical properties of the camera. These values, called calibration parameters, are typically the focal lengths, principal point, skew and lens distortion parameters. In the case of stereo cameras, one additionally estimates the relative 3D position and orientation of the left and right cameras.

In some embodiments, camera calibration parameters are estimated by acquiring one or more images of calibration targets and finding calibration parameters consistent with the observations.

A calibration target is an object that has patterns on its surface at known 3D positions in a reference frame attached to the object. To be of practical use, patterns must be detectable and accurately locatable in images of the calibration target, by means of automatic image processing operations. In some embodiments of patterns, called point patterns, there exists a unique remarkable 3D point, called a fiducial point, that can be localized on the pattern. The projection of the fiducial point can be uniquely localized in an image of the point pattern. A line pattern comprises a unique 3D line that can be localized on the pattern by its unique properties, for example in a ridge pattern, the line with maximum brightness. The image of that 3D line forms a curve that can unambiguously be localized in the image. The image of a calibration pattern is often called a "calibration feature", or simply an "image feature."

A 3D point with known physical location is often referred to as a 3D point with known coordinate in a given reference frame. For example, a reference frame can be attached to a display screen, wherein the origin of coordinates is located at the top-left pixel of the screen and the X axis points rightward along the horizontal side of the screen and the Y axis points downward along the vertical side of the screen and the Z axis points orthogonally to the screen surface, away from a person viewing the screen. Knowing the coordinates of a 3D point in one reference frame does not imply knowing the coordinates of said 3D point in another reference frame. For example, knowing the coordinates of a 3D point in the frame attached to one screen does not imply knowing the coordinates of said 3D point in the frame attached to another screen.

We call "fiducial point" any 3D point on a calibration target which has known coordinates in a reference frame attached to the calibration target and which can be localized in an image of the calibration target. Typical uses of fiducial points include computing one or more calibration parameters of the camera and/or computing the relative pose of the camera with respect to the calibration target (i.e. computing camera-to-target transformation).

The words "calibration pattern" are commonly used to refer to either the whole pattern displayed on the whole visible surface of a calibration target, or to the smaller part, such as an individual 2×2 square region of a checkerboard, an individual disk, blob or ridge, that projects into an individual image feature. One practiced in the art readily determines the meaning of the words "calibration patterns" based on context.

Typically, a single fiducial is not sufficient to estimate one or more calibration parameters. The number of fiducials needed to calibrate a camera depends on many factors, including the nature of the fiducials (lines or points), on their 3D configuration (e.g., alignment, planarity), on their positions relative to the camera, on the number of images being used, and the calibration parameters that are being determined. It is typical to use more fiducials than are theoretically needed because more fiducials usually improve the accuracy of the calibration process. For example, when using a planar calibration target to estimate eight calibration parameters (X- and Y-focal lengths, X and Y coordinates of the principal point and four distortion parameters $k\_0, k\_1, k\_2$ and $k\_3$ used in Tsai's calibration method), it is common to have over a hundred fiducials on the target and to acquire a tens of images. Also for example, when calculating 22 parameters for a stereo camera (eight parameters for each camera, plus three parameters to represent the translation vector from on camera to the other, and three other parameters to define the rotation from one camera to the other), it is typical to also use over a hundred fiducials and to acquire tens of images to improve accuracy.

Figure 4:
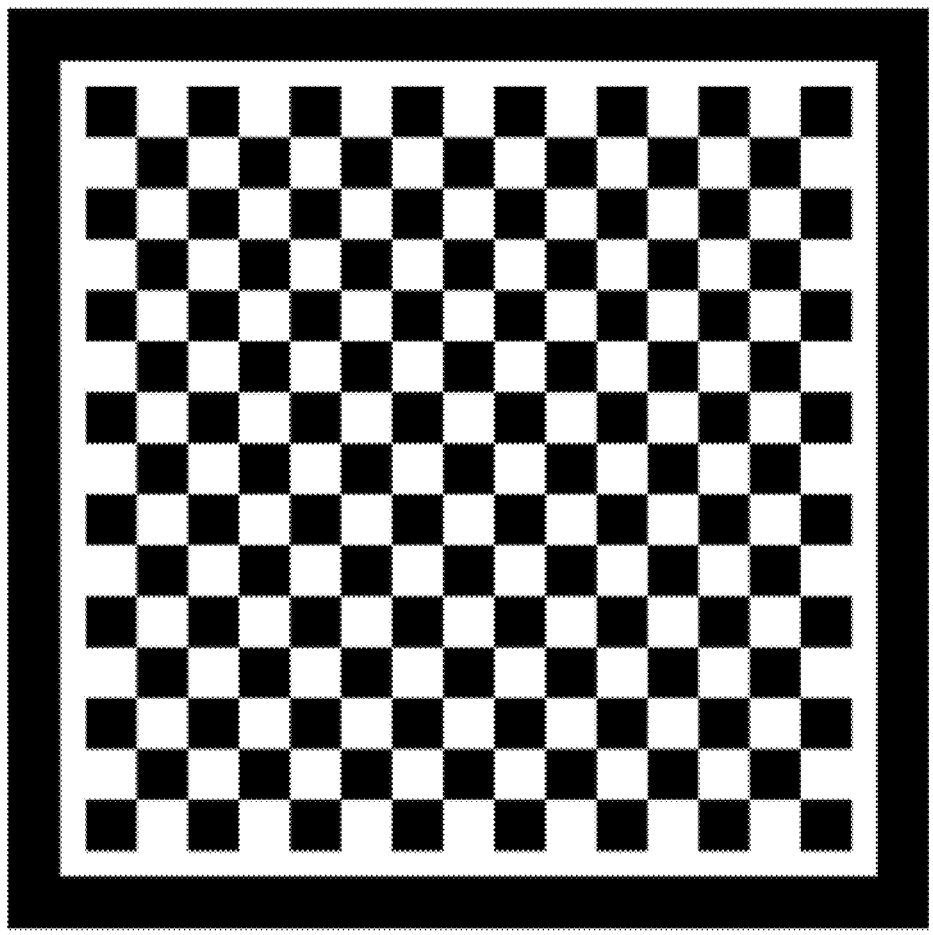
FIG. 4 is an image illustrating an embodiment of a calibration object or target.

FIG. 4 is an image illustrating an embodiment of a calibration object or target. In the example shown, the target comprises a checkerboard of dark and light squares. The points where four squares intersect can be used as fiducial points. The coordinates of these points are known in a frame attached to the target.

Figure 5:
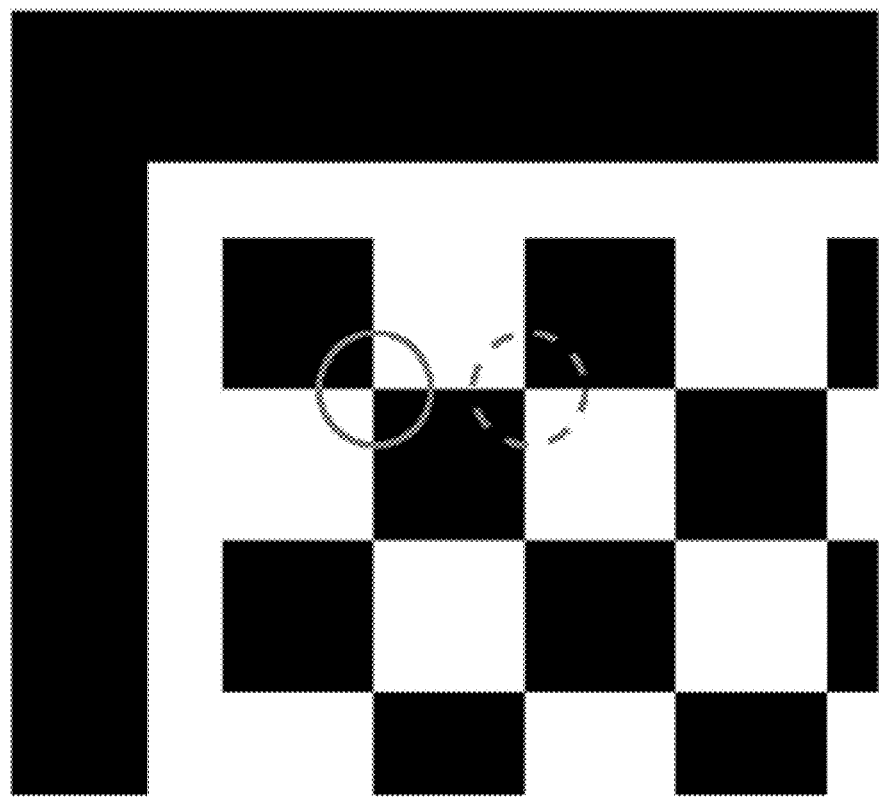
FIG. 5 is an image illustrating an embodiment of checkerboard fiducials.

FIG. 5 is an image illustrating an embodiment of checkerboard fiducials. In the example shown, two fiducial points are circled. Because the shape and dimensions of the checkerboard are known, 3D coordinates can be assigned to each fiducial point in the frame attached to the target. For example, the intersection marked with the solid circle (on the left) can be given coordinates (0,0,0), while the intersection marked with the dashed circle (on the right) can be given (0,W,0), where W is the width of each square on the printed target. All points on the surface of the target are assigned Z coordinate equal to 0. Note that, in order to unambiguously assign the origin of coordinates (0,0,0) to one particular fiducial, that point must be distinguishable from the others. In this example, the top-left intersection is unambiguously identifiable by being the only one located in the top left corner of the calibration target. The two calibration fiducials can be automatically located in the image and are the projections of known 3D points.

Figure 6A:
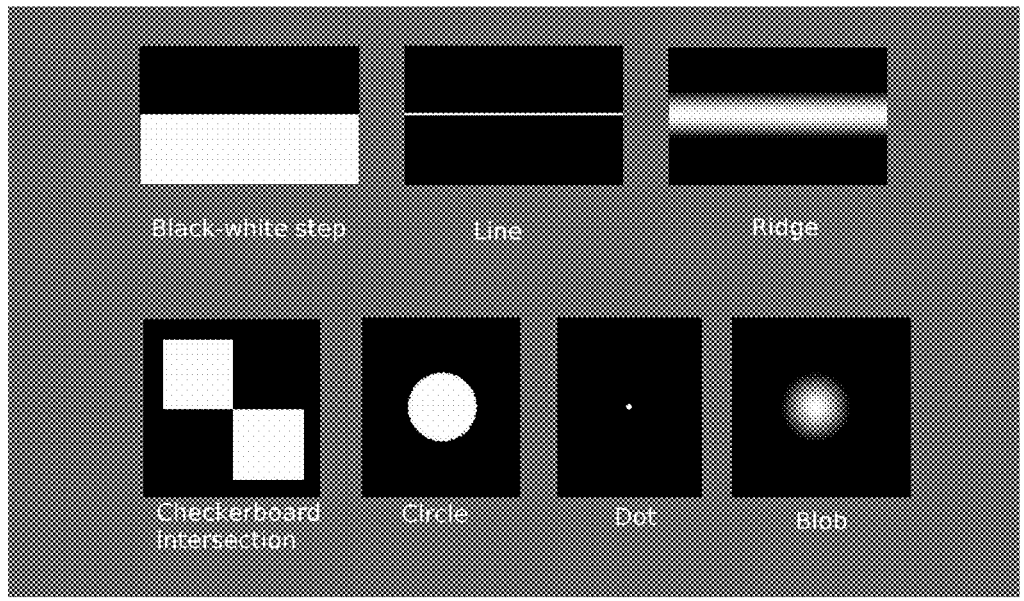
FIG. 6A illustrates an embodiment showing some calibration patterns.

FIG. 6A illustrates an embodiment showing some calibration patterns. In the example shown, the first row shows (horizontal) linear patterns: from left to right are high contrast bands (e.g., step transitions from black to white), a line, and a ridge pattern; the second row shows point patterns: a checkerboard (the fiducial point is the common intersection of four squares), and three circular patterns: a disc, a dot (a tiny disc) and a blob (a smooth bump). The fiducial point of the circular patterns is at the center of the pattern. In various embodiments, the pattern comprises high contrast bands, a disk, a dot pattern, a line pattern, a ridge pattern, a cross pattern, an intersection pattern, or any other appropriate calibration pattern.

Figure 6B:
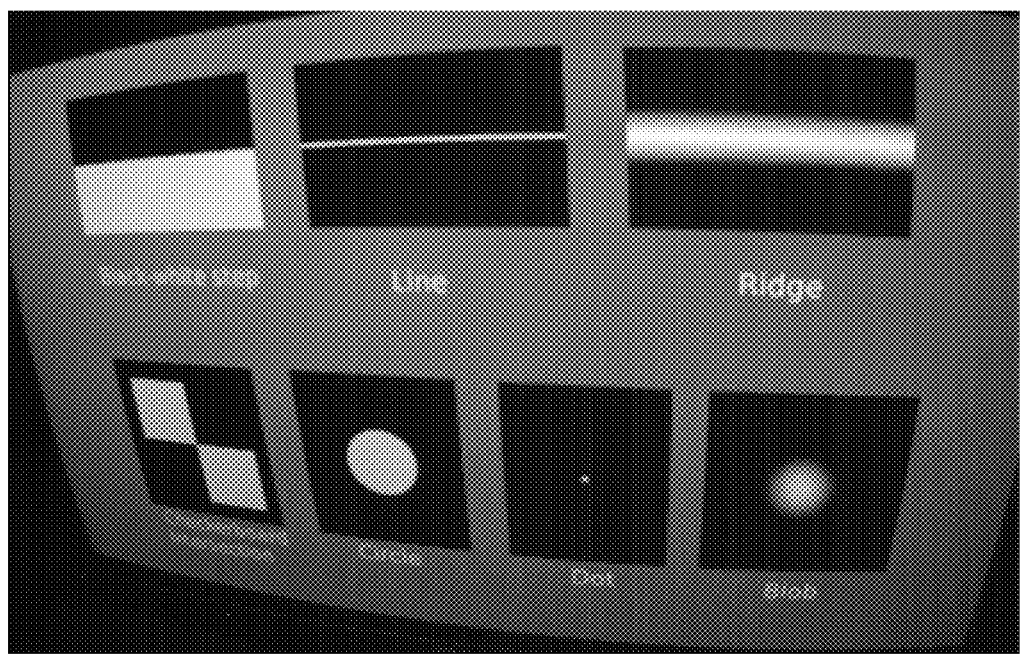
FIG. 6B illustrates an embodiment showing an image seen from a camera of the patterns shown in FIG. 6A.

FIG. 6B illustrates an embodiment showing an image seen from a camera of the patterns shown in FIG. 6A. In the example shown, for linear patterns, image features can be computed at transition points, e.g., between black and white in the high contrast band image, that is, points that locally maximize the amplitude of the gradient along the gradient direction. For a vertical ridge pattern, the ridge feature is a smooth approximately vertical curve consisting of points that are local maxima of the image intensity taken along the X axis of the image. The image of a linear pattern is in general an image curve. For checkerboards, the corresponding image features are points at the intersection of four extracted line segments. For discs and other circular patterns, the features are typically the image point at the center of the projected pattern. The image of a point pattern is in general an image point.

The accuracy of the camera calibration process depends on the accuracy with which image features are located. Projections of lines in the image can be accurately located using relatively easy image processing steps, but are usually not used because they convey less information than point patterns and thus require more images to be captured. Checkerboard and circular features can be localized with good accuracy, but require considering a region of the image around each image feature for good detection and localization. This limits how close a feature can be to the edges of the image, and also limits the density of the features in the image.

The calibration target needs to be accurately physically characterized. In some embodiments where the calibration target is a display screen, the manufacturer of the display screen provides the size of the display area and the pixel pitch in the specifications of the screen. The metric width and height of the screen and the resolution of the screen in pixels, taken together, can determine the position of each light-emitting element. In some embodiments, the screen dimensions are measured directly. For example, by displaying a pattern that is entirely black except for the four corner pixels that are white. Each corner being then easily identifiable, one can measure the distances between all pairs of corners. Multiple measurements can be taken for increased accuracy. These measurements provide the screen dimensions and allow verification of the rectangular shape of the display area. This assumes the pixel size is constant along a row or column of the screen (constant pitch size). These measurements are then used to help in determining the 3D position of fiducial points on the screen, which in turn are used to calibrate the camera.

FIGS. 7A and 7B illustrate embodiments of images of multiple calibration patterns. In the example shown, using a display screen to display target patterns has important advantages. If the relative location of the camera and screen are fixed, two or more calibration images can be displayed with precise relation to each other and identical relationship to the camera. For instance, a horizontal line pattern (e.g., line 700 at ridge) can be displayed (e.g., FIG. 7A), followed by a vertical line pattern (e.g., line 702 at ridge in FIG. 7B), in which case the virtual intersections (e.g., 708) of these lines (e.g., line 704 and line 706) are the actual fiducial points whose projections in the image are used as input to the calibration algorithm. FIG. 7A shows the image of horizontal ridges and the ridge curves localized in this image. The curves comprise projections of screen points with known Y coordinates (and Z=0). FIG. 7B shows the image of a vertical ridge and the corresponding ridge curves. The curves comprise projections of screen points with known X coordinates (and Z=0).

FIG. 7C is a diagram illustrating an embodiment of a virtual composite of features, comprising the curves shown in FIG. 7A and FIG. 7B. In the example shown, the intersections of these curves are projections of screen points with known X, Y and Z coordinates (in the coordinate system attached to the screen).

Figure 8:
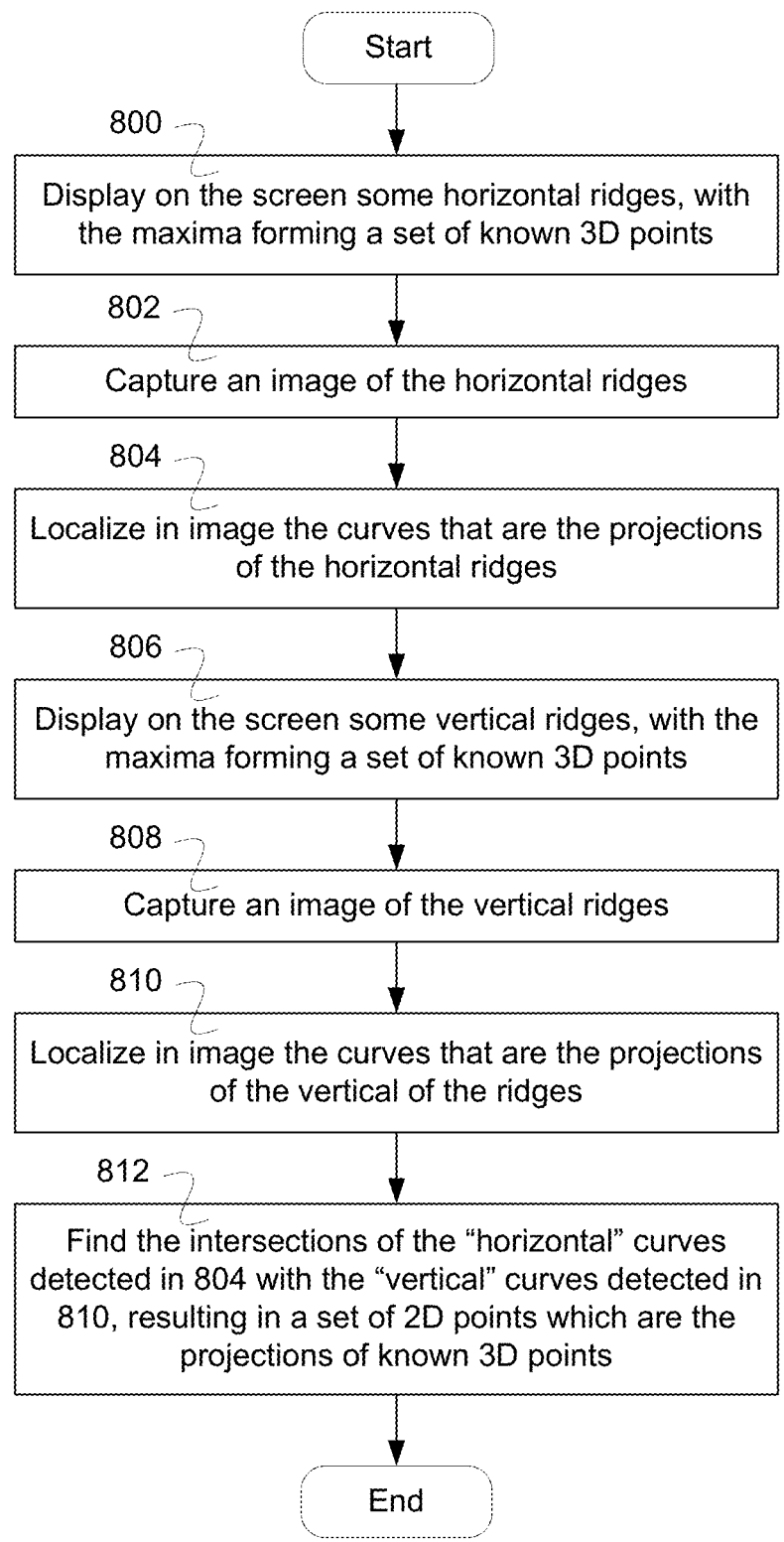
FIG. 8 illustrates an embodiment of a process for computing feature locations using multiple patterns.

FIG. 8 illustrates an embodiment of a process for computing feature locations using multiple patterns. In the example shown, to provide a specific example, the following procedure describes how to localize the image projection of a known 3D point by intersecting the image projections of horizontal and vertical curves. The procedure is as follows:

Display on the screen some horizontal ridges, with the maxima forming a set of known 3D points (800),
Capture an image of the horizontal ridges (802)
Localize in image the curves that are the projections of the maxima of the horizontal ridges (804),
Display on the screen some vertical ridges, with the maxima forming a set of known 3D points (806),
Capture an image of the vertical ridges (808),
Localize in image the curves that are the projections of the maxima of the ridges (810),
Find the intersections of the "horizontal" curves detected in 804 with the "vertical" curves detected in 810, resulting in a set of 2D points which are the projections of known 3D points (812), This type of process allows extremely accurate location of point features with very simple image processing steps which require very small local image regions to compute.

In the example shown, rectilinear ridge calibration patterns were used, but other patterns, such as step edges or lines, rectilinear or not, can be used in the same way, and other calibration features could also benefit from this technique of using multiple display images to detect precise locations of the features used The accuracy of the camera calibration process depends on the number of features used—denser features increase accuracy. It is desirable to have as many features as possible on the calibration target. Features may not however be packed too densely on the calibration object because they would then appear too close to each other in the image for robust localization.

When using a display screen as a calibration target, one may multiply the number of features, without having to pack the features in the image. By shifting calibration patterns in the display screen P times, without moving the camera or screen, one multiplies by P the number of features, without increasing the number of different camera poses.

A process for multiplying the number of features by VH (the product of two natural numbers V and H) while multiplying the number of patterns by V+H is disclosed. As a result, one efficiently obtains a higher density and number of features than could be obtained with a regular calibration target.

Figure 9B:
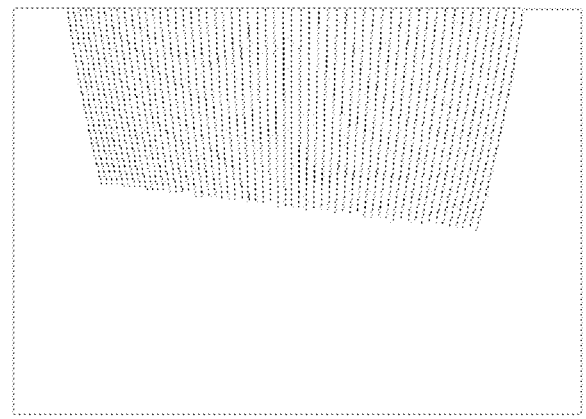
Figure 9C:
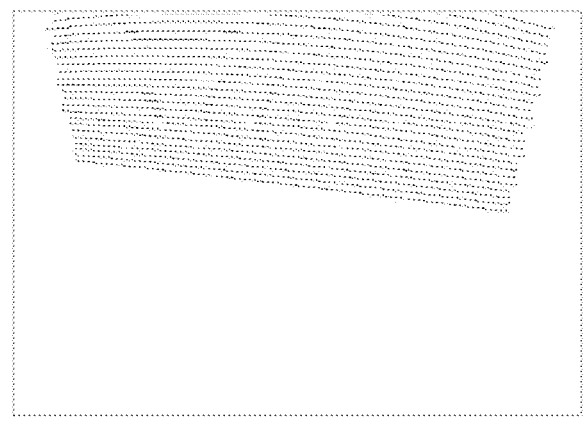
Figure 9D:
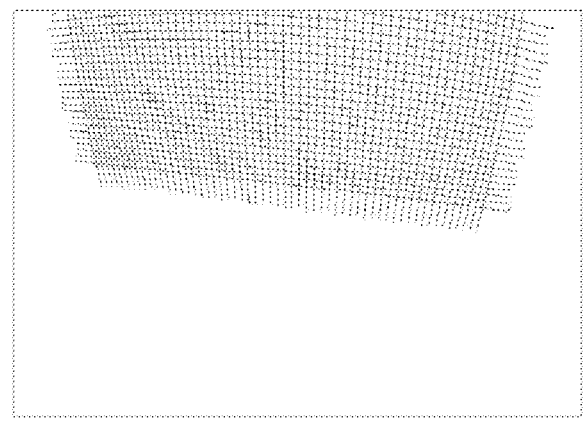

FIGS. 9A1, 9A2, 9A3, 9A4, 9B, 9C, and 9D illustrate embodiments of features obtained in the process for achieving denser features. In the examples shown, when localizing features by intersecting horizontal and vertical curves, as explained above, one can produce a large number of image features efficiently: by shifting the vertical pattern V times (e.g., FIGS. 9A1, 9A2, 9A3, and 9A4) and shifting the horizontal pattern H times, one can multiply the number of features by VH. FIG. 9B shows vertical curves obtained from four shifted line patterns. FIG. 9C shows horizontal curves obtained from four shifted line patterns. FIG. 9D shows resulting line intersections from FIG. 9B and FIG. 9C. By multiplying the number of horizontal and vertical curves by four (V=H=4), one multiplies the number of calibration features by 16 (V×H=16).

Figure 10:
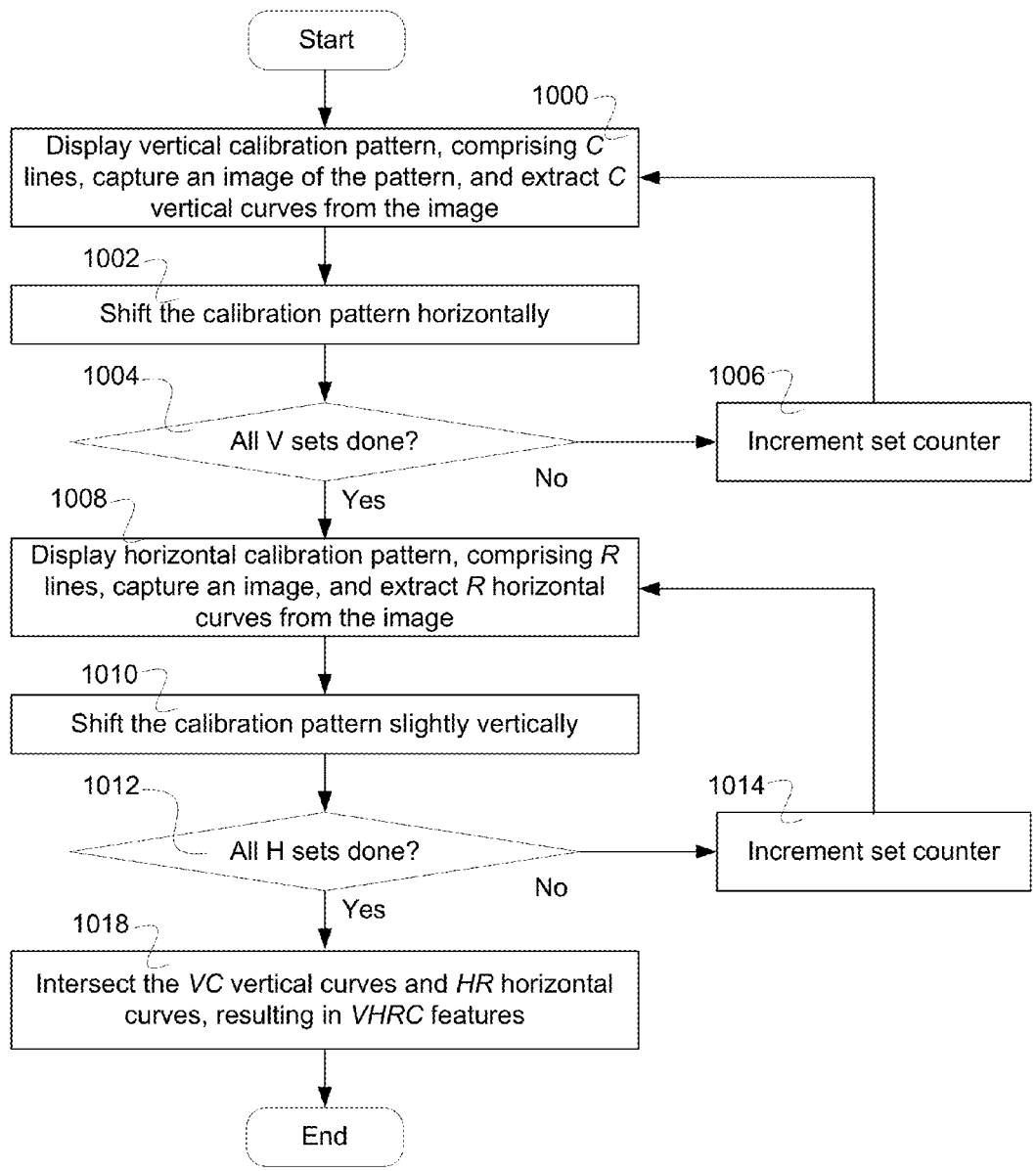
FIG. 10 is a flow diagram illustrating a process for multiplying the number of features by VH, while multiplying the number of patterns by V+H.

FIG. 10 is a flow diagram illustrating a process for multiplying the number of features by VH, while multiplying the number of patterns by V+H. In the example shown, vertical patterns are displayed V times, then horizontal patterns are displayed H times on the same display, and virtual intersections of the vertical and horizontal features are identified. The method comprises:

Display a vertical calibration pattern, comprising C lines, capture an image of the pattern, and extract C vertical curves from the image (1000),
Shift the calibration pattern horizontally (1002); For example, for a pattern with a horizontal periodicity, shift by 1/Vth of the period,
Determine whether all sets are done (1004). For example, by checking a set counter. A set comprises displaying, capturing, and extracting C curves (e.g., FIG. 9A1, or 9A2, or 9A3, or 9A4)
In the event that all the sets are not done, the set counter is incremented (1006) and control passes to 1000; in the event that all the sets are done (FIG. 9B), control passes to 1008,
Display horizontal calibration pattern, comprising R lines, capture an image, and extract R horizontal curves from the image (1008),
Shift the calibration pattern vertically (1010); For example, for a pattern with a vertical periodicity, shift by 1/Hth of the period,
Determine whether all sets are done (1012). For example, by checking a set counter. A set comprises displaying, capturing, and extracting R
In the event that all the sets are not done, the set counter is incremented (1014) and control passes to 1008; in the event that all the sets are done (FIG. 9C), control passes to 1016,
Intersect the VC vertical curves (FIG. 9B) and HR horizontal curves (FIG. 9C), resulting in VHRC features (1018) as shown in FIG. 9D.

This method produces sets of very dense calibration features using a series of sparse images.

In some embodiments, a series of targets displayed using a display are used to compensate for variation in pattern intensity. For example, another advantage of using active targets on a display screen over fixed calibration targets is the ability to compensate for effects of camera vignetting and non-isotropic surface radiance (screens emit with different intensities depending on viewing direction). This can be done, for example, by capturing three patterns with the same camera exposure parameters without moving the camera or screen.

The first two, a black image (low radiance) and a white image (high radiance), serve to establish the screen location in the image, and typical image intensity levels at each location (which are functions of this screen, camera and exposure settings, and viewing position), which allow for computing a normalized image of the actual pattern image which is also displayed.

Figure 11:
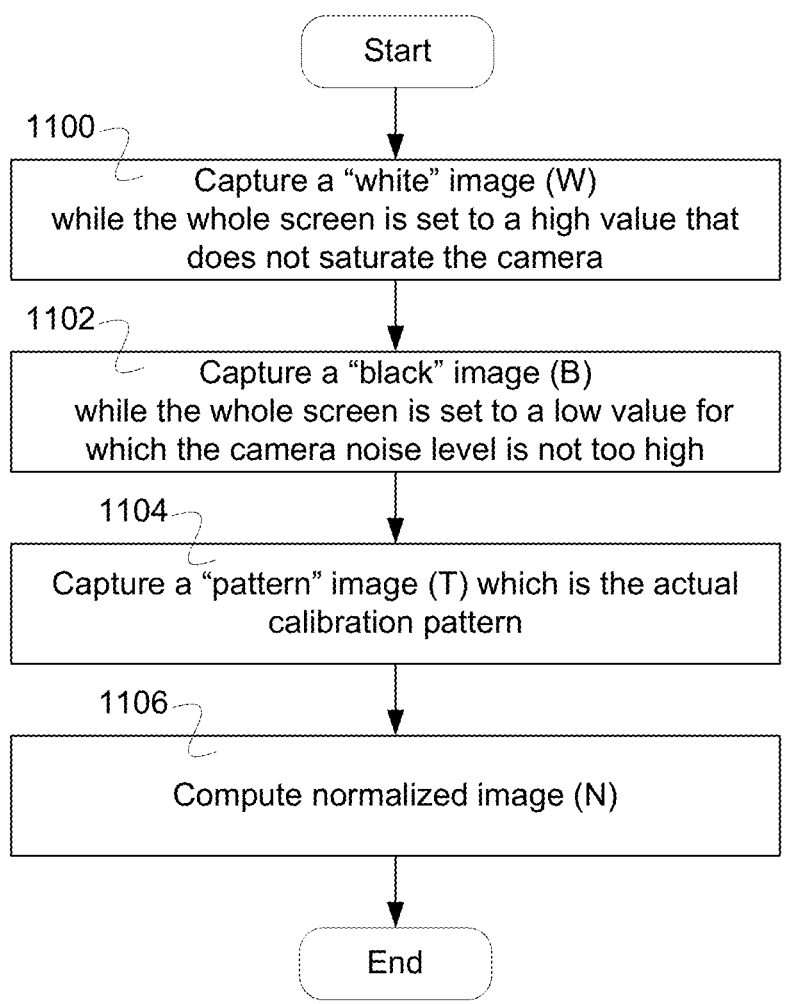
FIG. 11 is a flow diagram illustrating an embodiment of a process for capturing a normalized calibration pattern image.

FIG. 11 is a flow diagram illustrating an embodiment of a process for capturing a normalized calibration pattern image. In the example shown, to capture the image of a calibration pattern, three images are captured while keeping the camera gain fixed, the camera and screen immobile. From these captured images a "normalized" image is calculated.

- Capture a "white" image (W) while the whole screen is set to a high value that does not saturate the camera (1100),
- Capture a "black" image (B) while the whole screen is set to a low value for which the camera noise level is not too high (1102); At each pixel location x, the gray level value B(x) is less than or equal to W(x); It is less than W(x) at pixels that are projections of part of the screen and equal or very similar to W(x) at pixels that are mostly unaffected by the display,
- Capture a "pattern" image (T) which is the actual calibration pattern. At each pixel location x, the gray level value T(x) is between B(x) and W(x) (1104),
- Compute normalized image (N) (1106); For example, at every pixel location x such that W(x)−B(x) is small, assume that x does not correspond to a part of the screen. Since these pixels are not of interest, define N(x)=0; All other pixels x are the projections of part of the screen (except a few pixels at which reflections of the screen are seen). Define N(x)=(T(x)−B(x))/(W(x)−B(x)); The value of N(x) is always between 0 and 1. When capturing the three images, the gain of the camera is fixed so that the screen, at its maximum brilliance, does not saturate the gray-level values of the image.

Figure 12A:
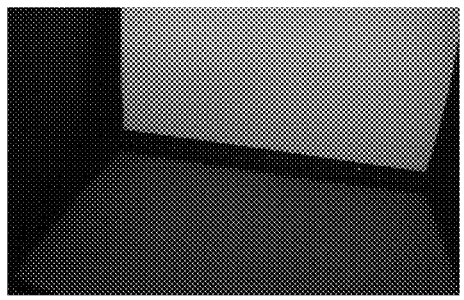
FIGS. 12A, 12B, 12C, and 12D are images illustrating embodiments of white, black, pattern, and normalized images.
Figure 12B:
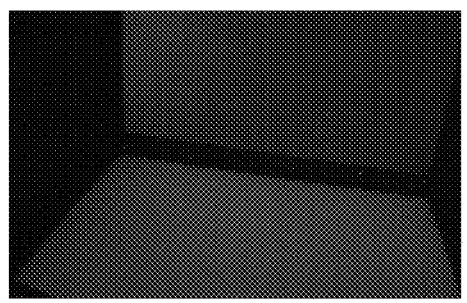
Figure 12C:
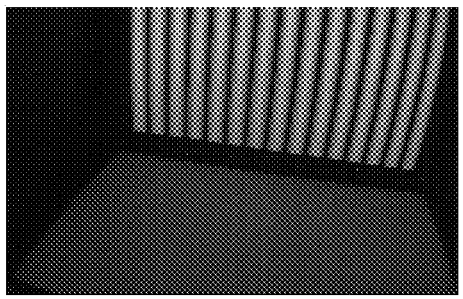
Figure 12D:
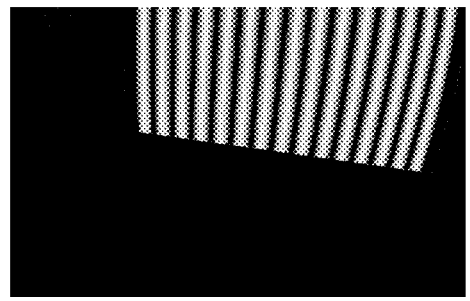

FIGS. 12A, 12B, 12C, and 12D are images illustrating embodiments of white, black, pattern, and normalized images. In the examples shown, a typical triplet of white (FIG. 12A), black (FIG. 12B), and pattern images (FIG. 12C) are shown together with the resulting normalized image (FIG. 12D). In this example, the pattern comprises vertical ridges. FIG. 12A shows an image of a white pattern. FIG. 12B shows an image of a black pattern. FIG. 12B differs from FIG. 12A only in the image region covered by the display screen. In the image region covered by the display screen, FIG. 12A appears light-colored (e.g., has high gray-level values), whereas FIG. 12B appears dark-colored (e.g., has low gray-level values). FIG. 12C shows an image of a vertical ridge pattern. It differs from FIGS. 12A and 12B only in the image region covered by the display screen. In the image region covered by the display screen, FIG. 12C has 15 (fifteen) ridges oriented approximately vertically. Each ridge forms a curve oriented approximately vertically. The gray-level of pixels along the curve differ because of camera vignetting and because of non-isotropic screen surface radiance. FIG. 12D shows a normalized image of a vertical ridge pattern (e.g., obtained using the process of FIG. 11). FIG. 12D has 15 ridges. The gray-level of pixels along the ridge differ much less than in the image shown in FIG. 12C. The more uniform gray-levels of pixels along the ridges help in the image processing operations that are used to locate the ridges. The locations of the ridges in FIG. 12D are nearly identical to the locations of the ridges in FIG. 12C. FIG. 12D, the normalized image, clearly has more uniform intensity along ridges than the original image.

Figure 13A:
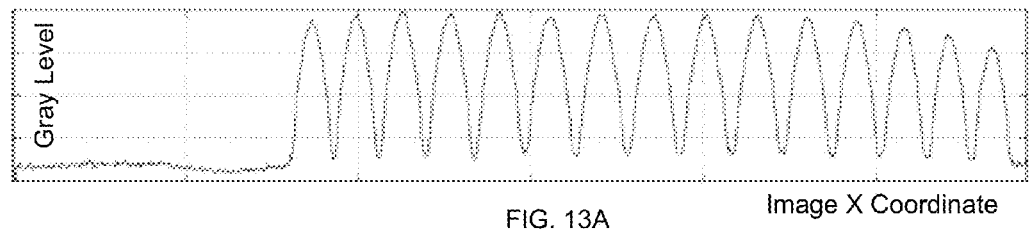
FIGS. 13A, 13B, 13C, and 13D are graphs illustrating embodiments of intensity cross sections.
Figure 13B:
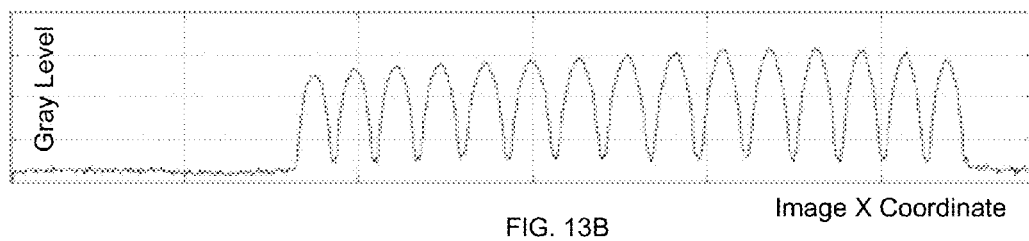
Figure 13C:
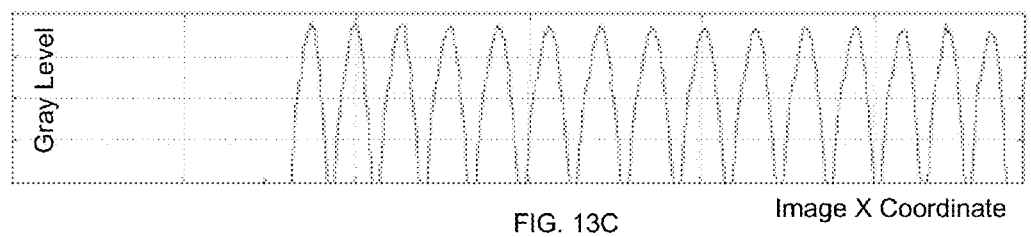
Figure 13D:
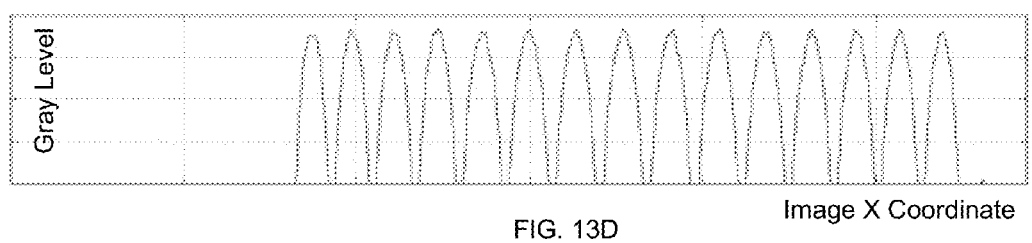

FIGS. 13A, 13B, 13C, and 13D are graphs illustrating embodiments of intensity cross sections. In the examples shown, the image intensity cross sections are shown that are taken from near the top and middle of the original image (FIG. 13A and FIG. 13B) and from near the top and middle of the normalized image (FIG. 13C and FIG. 13D).

The effects of non-uniform image intensity are reduced. The curve in FIG. 13A shows that graylevel maxima near the middle of the cross section are higher than at the right of the cross section; this same peaking does not occur in FIG. 13C. The level of the maxima along the ridges is clearly decreasing, as visible in the lower maxima of the curve in FIG. 13B, with respect to those of the curve in FIG. 13A This decrease does not occur for the cross sections after normalization, as seen by comparing the curves in FIG. 13C and in FIG. 13D.

Features can be extracted from a normalized image using simpler image processing functions, since the intensity ranges of the black and white portions of the pattern image are more uniform. An additional advantage of a normalized image is that regions that are not part of the display screen are readily identified and ignored from further processing. In some embodiments, a calibration pattern other than a ridge is used as part of the normalization process.

Figure 14:
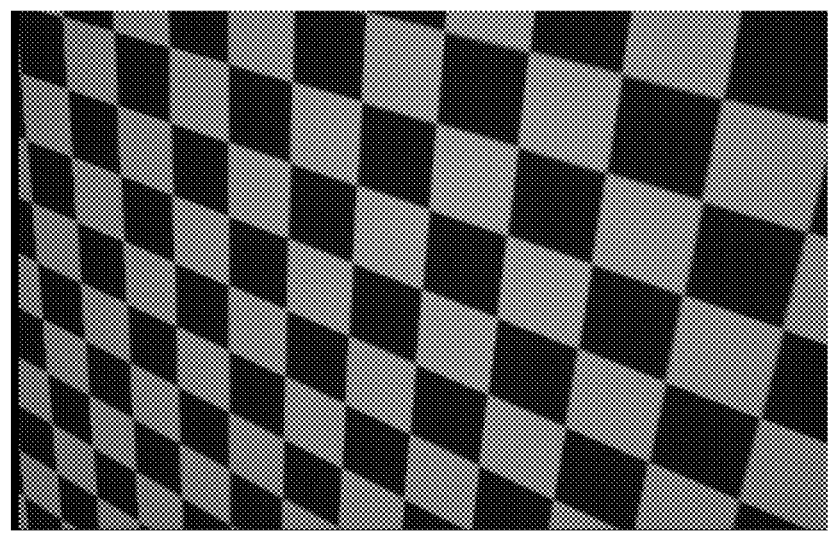
FIG. 14 is an image illustrating an embodiment of a calibration target.

FIG. 14 is an image illustrating an embodiment of a calibration target. In the example shown, an image is shown of a checkerboard calibration target that achieves good coverage. The quality of the calibration of a camera depends in part on being able to fill wide areas of the image with the calibration target. Note that, because the calibration target is repetitive, any image feature could be ascribed to the origin of coordinates. This has no adverse effect on the calibration of a single camera.

Figure 15A:
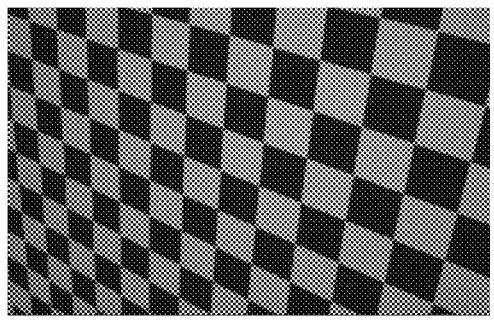
FIGS. 15A and 15B are a pair of images of an embodiment of a calibration target.
Figure 15B:
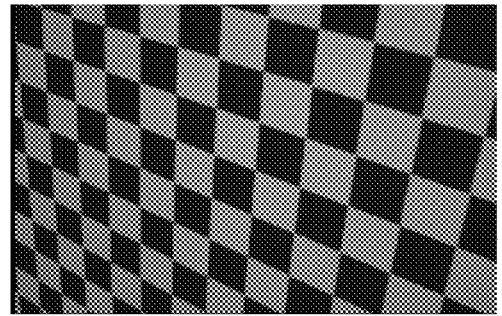

FIGS. 15A and 15B are a pair of images of an embodiment of a calibration target. This pair of images is not appropriate for calibrating a stereo camera. For the purpose of calibrating a stereo camera, repetitive calibration patterns would not be appropriate because one could not determine which feature in the right image corresponds to a given feature in the left image: the left to right correspondence of features is ambiguous. Consequently one could not determine the relative positions of the left and right cameras, which is a requirement in stereo camera calibration.

One solution would be to make (at least) one target point uniquely identifiable, for example by adding a marking on it. This, however, would complicate the whole process, by interfering with the localization of calibration features.

Figure 16A:
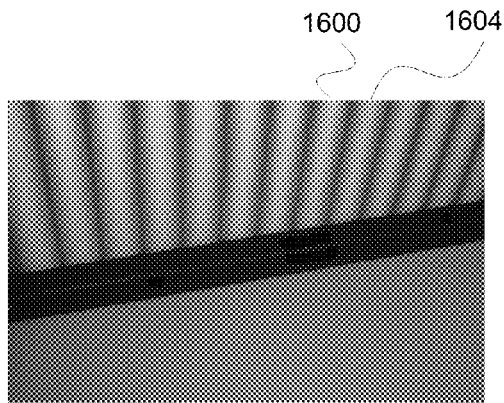
FIGS. 16A and 16B are a pair of images of an embodiment of a calibration pattern displayed on a screen.
Figure 16B:
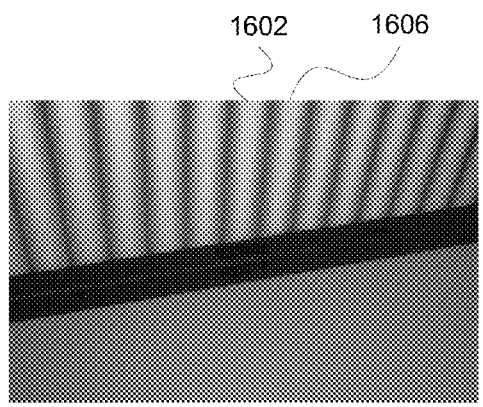

FIGS. 16A and 16B are a pair of images of an embodiment of a calibration pattern displayed on a screen. Like in FIGS. 15A and 15B, one cannot determine, from these images alone, the correspondence between features extracted in the left image and features extracted in the right image. However, when using a screen as a calibration object, the solution is straightforward: one may capture an additional image of a unique recognizable landmark.

Figure 16C:
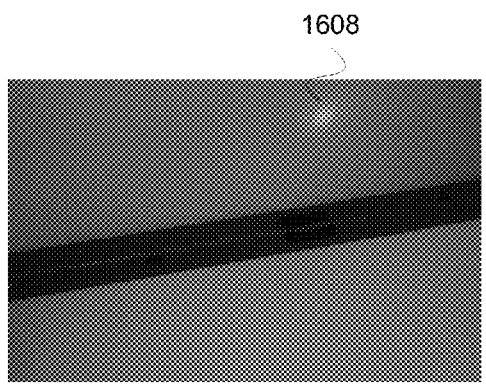
FIGS. 16C and 16D are a pair of images of an embodiment of a unique recognizable landmark.
Figure 16D:
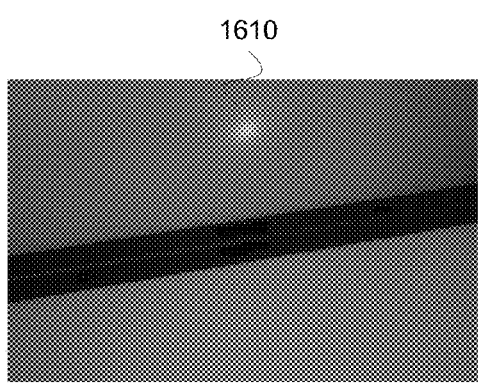

FIGS. 16C and 16D are a pair of images of an embodiment of a unique recognizable landmark. These images were captured while the camera and screens were in the same position as in FIGS. 16A and B. In this example, the pattern is a blob, centered at a screen location that also belongs to one of the ridge patterns. The left ridge feature 1600 in FIG. 16A that falls on blob 1608 in FIG. 16C is the image of the same ridge pattern that projects to the right ridge feature 1602 in FIG. 16B that falls on blob 1610 in FIG. 16D. These left and right features are then trivially put in correspondence. Then, starting from this correspondence, one can put in correspondence the feature 1604 at the right of 1600 with the feature 1606 at the right of 1602, and continue similarly to put in correspondence the features in the left and right images.

One skilled in the art would be able to adapt this process to put in correspondence horizontal features or point features.

Figure 17A:
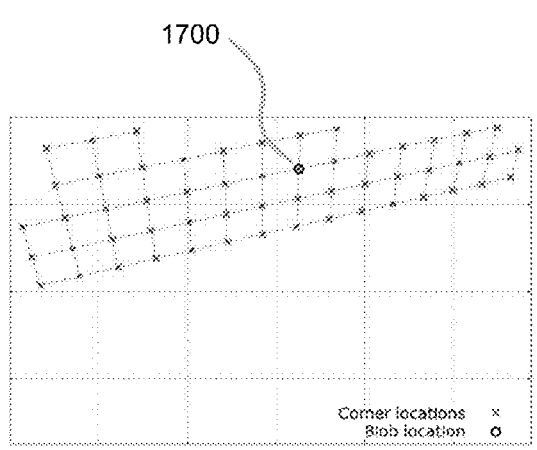
FIGS. 17A, 17B, and 17C are images illustrating an embodiment of a process for ascribing screen coordinates to each feature based on the known screen coordinates of a blob.
Figure 17B:
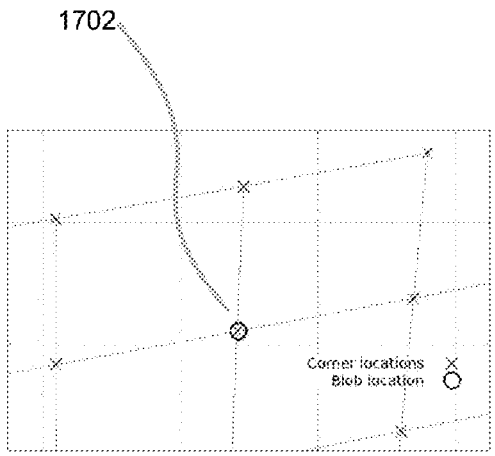
Figure 17C:
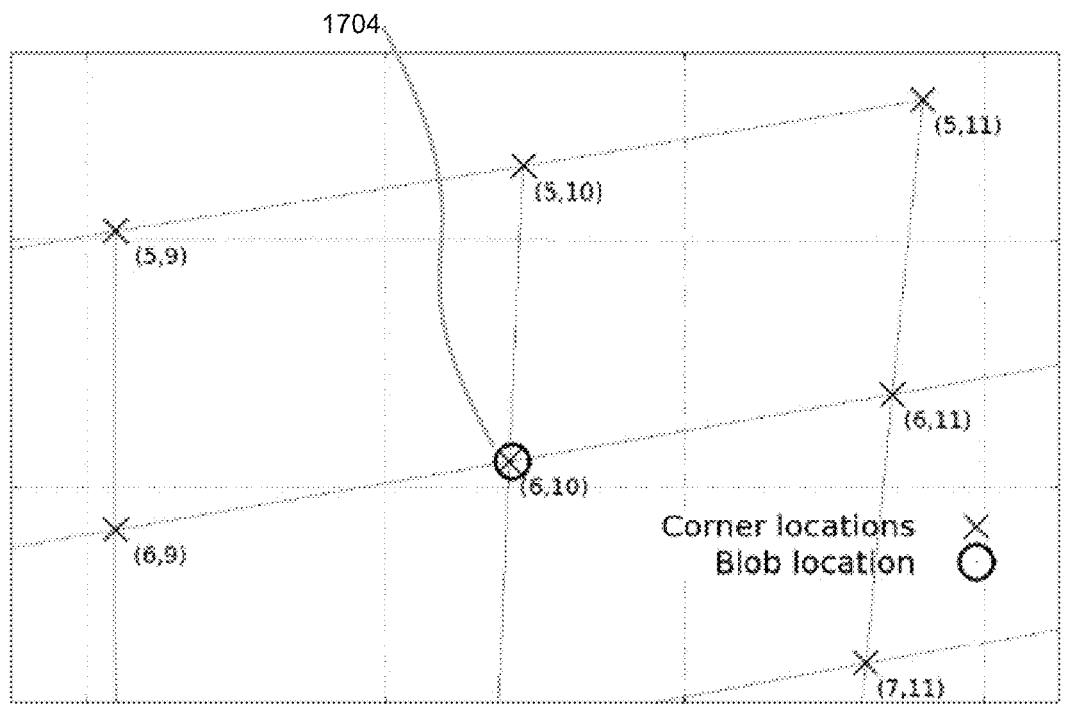

FIGS. 17A, 17B, and 17C are images illustrating an embodiment of a process for ascribing screen coordinates to each feature based on the known screen coordinates of a blob. In the example shown, FIG. 17A shows the image locations of the features and of blob 1700. FIG. 17B shows a close-up of FIG. 17A around blob 1702. FIG. 17C shows the same close-up where the screen coordinates of each feature are written next to other features. Here, blob 1704 has screen coordinates (6, 10). When this process is performed in left and right images, the result is that features in the left and right images that are ascribed the same screen coordinates are projections of the same screen feature. This process thus solves the correspondence problem between the left and right images.

In some embodiments, multiple planar targets are used to create a 3D calibration target. A display screen is inherently planar, or 2D. However, there are known advantages in simplifying the calibration process if 3D targets can be used. Primarily, a single view of a 3D target is sufficient whereas 2D targets must be viewed from different angles and distances for accurate calibration. Positioning the camera once is preferable for manufacturing since it is faster and enables a simpler manufacturing floor layout and work flow. However, traditional fixed 3D calibration targets typically require great manufacturing accuracy to achieve precise locations for all target points, resulting in a high cost. Detecting the target features can also be more difficult for a 3D target.

Using two or more planar targets (display screens or printed targets) to create an inexpensive 3D calibration target is disclosed. The key is a mechanism to accurately learn the relative position of the planar targets once they are rigidly positioned. The targets can then be used to display calibration patterns, as has been described, that enable accurate camera calibration from only one viewing position of the camera with respect to the targets. The following description is in the context of display screens, but could equally be well used with any other type of planar target, or any combination of calibration targets.

In some embodiments, the apparatus for using multiple planar targets to create a 3D calibration target includes: 1) two (or more) display screens for which pixel positions are known, either from datasheets provided by the manufacturer, or by direct measurement, 2) a system (e.g., a computer) that can control the display screens, control a camera, and perform calculations, and 3) at least one camera is needed to set up the calibration apparatus. In some embodiments, the camera is calibrated and only a single image is required. In some embodiments, the camera is not calibrated and two or more images are required. The screens are setup in such a way that the screens are not coplanar. The camera can be placed such that the screens (e.g., two screens) occupy most of the field of view of the camera.

Figure 18:
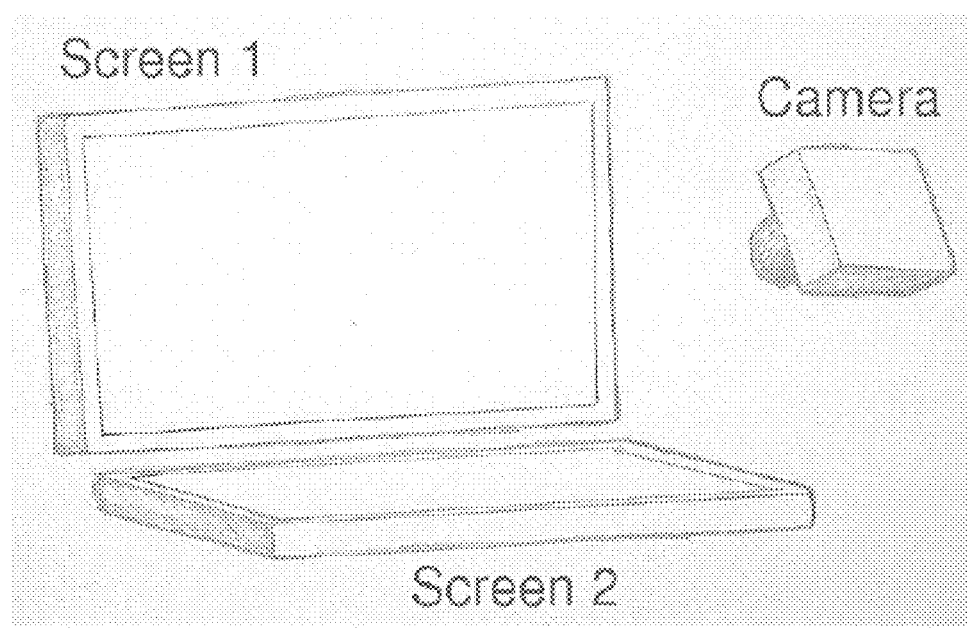
FIG. 18 is a diagram illustrating an embodiment of a setup with a "top" and a "bottom screen."

FIG. 18 is a diagram illustrating an embodiment of a setup with a "top" and a "bottom screen." In the example shown, a rectangular screen is placed with a fixed relative position to another screen. A camera is placed to view the two screens simultaneously. In some embodiments, each display screen is rectangular. In some embodiments, the configuration of the screens comprises aligning the screens along an edge of the screens. This configuration simultaneously maximizes the area of the display screens that will be visible (e.g., no screen area is wasted), and the amount of the image occupied by the screens. In some embodiments, the screens form an angle between 30 degrees and 150 degrees. If the planes that contain the surfaces of the screens, form too big (e.g., obtuse) an angle, then the two screens would be nearly coplanar and would not form an appropriate 3D calibration object. If on the contrary, the planes that contain the screens formed too small (e.g., acute) an angle, then, in the images produced by the camera, the perspective effect could greatly distort the projections of the patterns. In some embodiments, more than two screens can be used in the setup for calibration.

The coordinates of the fiducials on each calibration target are known in the reference frame attached to or associated with the target. In order to use two or more rigidly fixed calibration targets as a single calibration target, one has to determine the coordinates of the fiducials on each calibration target in a common reference frame.

The relationship, or correspondence, between coordinates in one frame and another frame is commonly defined by a 3×3 rotation matrix R and a translation 3-vector T. A 3D point that has a 3-vector $X_1$ as coordinates in the first frame has $$X_2 = RX_1 + T$$

as coordinates in the second frame. The function that maps $X_1$ to $X_2$ is often referred to as the "3D transformation defined by R and T" or "the 3D transformation R, T". When the first frame is attached to a screen and the second frame is attached to a camera, the 3D transformation between said two frames is called a screen-to-camera transformation. Conversely, a transformation between a camera frame and a screen frame is called a camera-to-screen transformation. Likewise, screen-to-screen and camera-to-camera transformations are defined. When the frames are attached to objects, one says that R and T define the relative pose of the objects.

When the coordinates of a 3D point are known in one reference frame and the relationship between coordinates in that reference frame and a second reference frame are known, the coordinates of the 3D point in the second reference frame can be determined When the coordinates of a 3D point is known in the frame attached to one screen, and the relationship between coordinates in the frame attached to that screen and the coordinates in the frame attached to a second screen are known, and the coordinates of a second 3D point is known in the frame attached to the second screen the coordinates in the second frame of the first point and the coordinates of the second point in the second frame can be determined. Knowledge of coordinates of two points and the relationship between coordinates allows the coordinates of both points to be determined in a common reference frame.

In some embodiments, the common reference frame is chosen to be the frame attached to the camera.

Figure 19A:
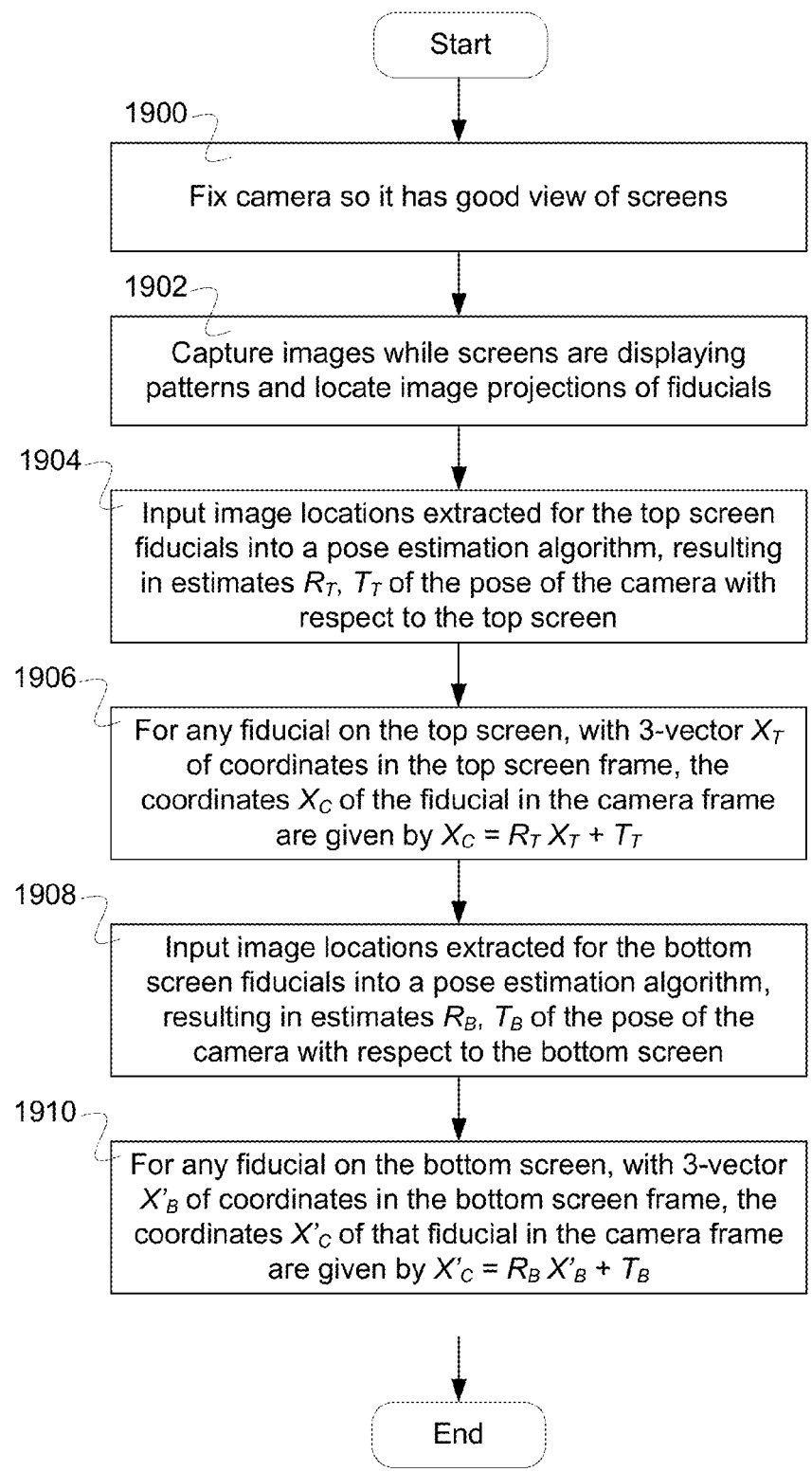
FIG. 19A is a flow diagram illustrating an embodiment of a process for determining the coordinates, in the camera frame, of the fiducials on two or more calibration targets.

FIG. 19A is a flow diagram illustrating an embodiment of a process for determining the coordinates, in the camera frame, of the fiducials on two or more calibration targets. In this process, one calibrated camera is required. For the following, two screens are used; however, the system can be adapted to use a different number of screens as one practiced in the art would be able to see. One practiced in the art would also readily be able to see that calibration targets other than screens can be used. To determine the coordinates, in the camera frame, of fiducials on all calibration targets:

Fix camera so it has good view of screens (1900)—for example, two screens, capture images with a calibrated camera while screens are displaying patterns and locate image projections of fiducials (1902), input image locations extracted for the top screen fiducials into a pose estimation algorithm, resulting in estimates $R_T$, $T_T$ of the pose of the camera with respect to the top screen (1904), for any fiducial on the top screen, with 3-vector $X_T$ of coordinates in the top screen frame, the coordinates $X_C$ of the fiducial in the camera frame are given by $X_C = R_T X_T + T_T$ (1906), input image locations extracted for the bottom screen fiducials into a pose estimation algorithm, resulting in estimates $R_B$, $T_B$ of the pose of the camera with respect to the bottom screen (1908), for any fiducial on the bottom screen, with 3-vector $X'_B$ of coordinates in the bottom screen frame, the coordinates $X'_C$ of that fiducial in the camera frame are given by $X'_C = R_B X'_B + T_B$ (1910).

This process results in the coordinates, in the camera frame, of the fiducials on the calibration targets.

In some embodiments, the common reference frame is chosen to be different from the frame attached to the camera. In some embodiments, the reference frame is chosen to be one of the calibration target frames, e.g. the reference frame attached to the top screen. In some other embodiments, the reference frame is chosen so the center of gravity of the set of fiducials has coordinate vector (0,0,0). In some embodiments, the reference frame is chosen so its axes are aligned with the axes of one of the screens.

In some embodiments, there are more images captured, and/or there are more camera poses, resulting in more data. In some embodiments, different computational processes are used to determine the locations of fiducials in a common reference frame. In some embodiments, the locations of fiducials in a common reference frame are the result of a least-squares estimation procedure.

Figure 19B:
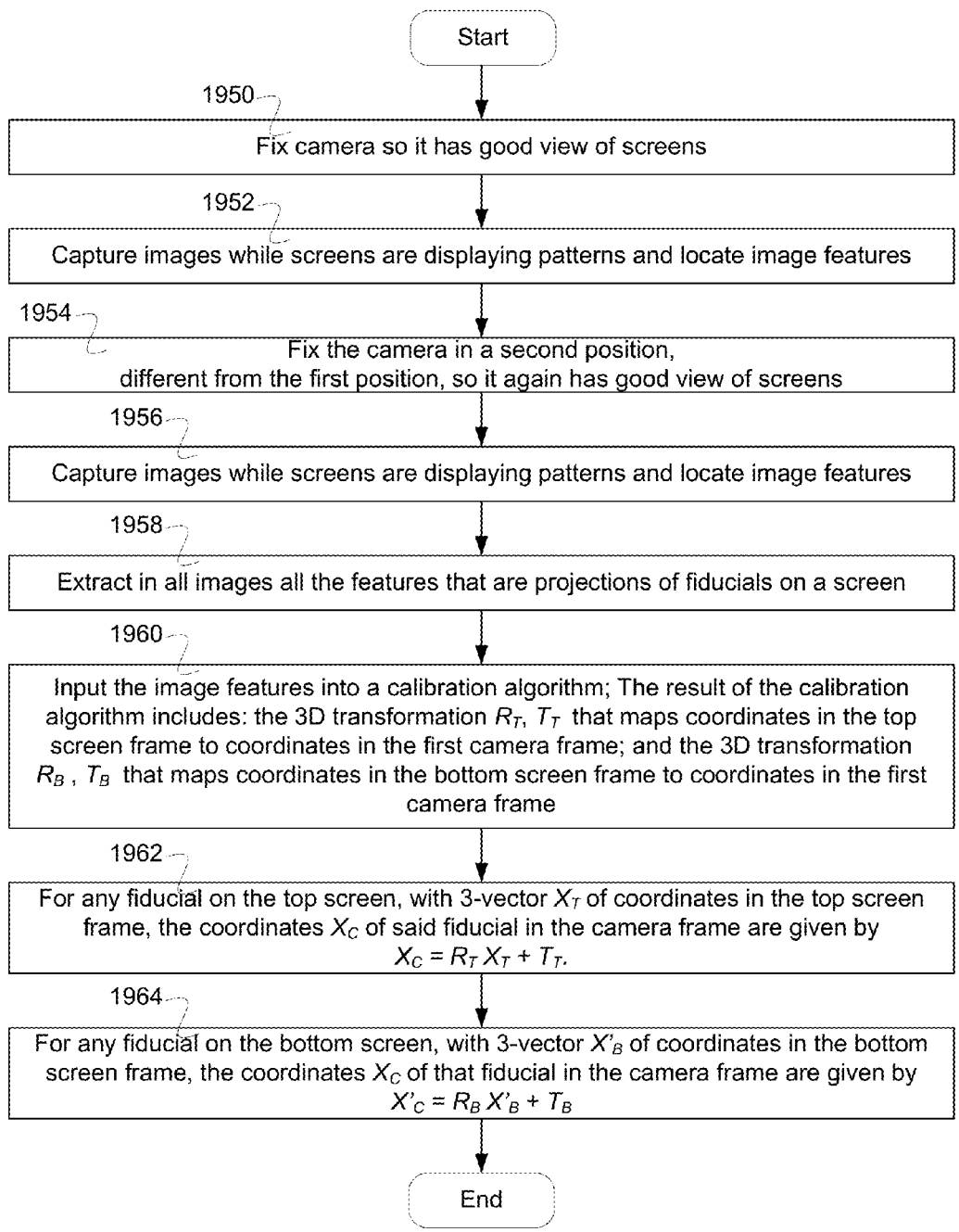
FIG. 19B is a flow diagram illustrating an embodiment of a process for determining in a common reference frame the positions of the fiducials on two or more screens, using an uncalibrated camera.

FIG. 19B is a flow diagram illustrating an embodiment of a process for determining in a common reference frame the positions of the fiducials on two or more screens, using an uncalibrated camera. For the following, two screens are used; however, the system can be adapted to use a different number of screens as one practiced in the art would be able to see. One practiced in the art would also readily see that calibration targets other than screens can be used. In this process, only one camera is required and this camera can be an un-calibrated camera. To determine the coordinates of fiducials on all screens in a common reference frame:

Fix camera in a first position so it has good view of screens (1950)—for example, two screens, capture images while screens are displaying patterns and locate image features (1952), fix the camera in a second position, different from the first position, so it again has good view of screens (1954), capture images while screens are displaying patterns and locate image features (1956), extract in all images all the features that are projections of fiducials on a screen. This results in four sets of features: two for the top screen, and two for the bottom screen (1958), input the image features into a calibration algorithm (1960)—for example, Zhang's algorithm. The result of the calibration algorithm includes:

the 3D transformation $R_T$, $T_T$ that maps coordinates in the top screen frame to coordinates in the first camera frame.

the 3D transformation $R_B$, $T_B$ that maps coordinates in the bottom screen frame to coordinates in the first camera frame.

For any fiducial on the top screen, with 3-vector $X_T$ of coordinates in the top screen frame, the coordinates $X_C$ of said fiducial in the camera frame are given by $X_C = R_T X_T + T_T$. (1962), for any fiducial on the bottom screen, with 3-vector $X'_B$ of coordinates in the bottom screen frame, the coordinates $X_C$ of that fiducial in the camera frame are given by $X'_C = R_B X'_B + T_B$ (1964), the result of this process is the coordinates of the fiducials on the calibration targets, in the frame attached to the camera in the first position.

Figure 20A:
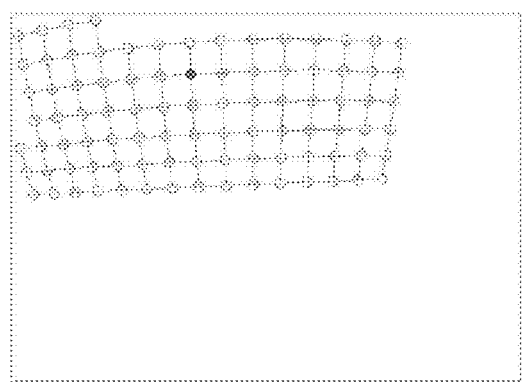
FIGS. 20A and 20B are images illustrating embodiments of identified image features.
Figure 20B:
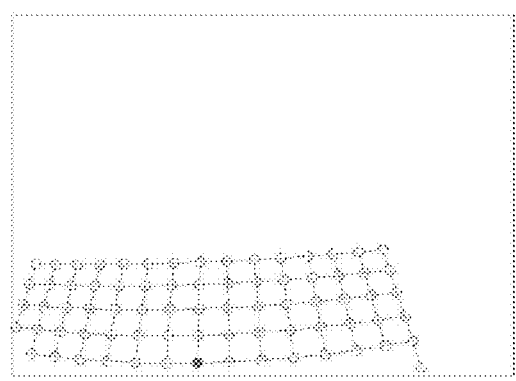

FIGS. 20A and 20B are images illustrating embodiments of identified image features. In the examples shown, image features are displayed that are projections of known locations on the "top" screen (FIG. 20A) and "bottom" screen (FIG. 20B). FIG. 20A shows one set of features pertaining to the top screen, extracted in one image. FIG. 20B shows one set of features pertaining to the bottom screen, extracted in one image.

In some embodiments, there are more camera poses and/or captured images, resulting in more data. In some embodiments, other computational processes are used to determine the locations of fiducials in a common reference frame. In some embodiments, the locations of fiducials in a common reference frame are the result of a least-squares estimation procedure.

In some embodiments, the relationship between screen and camera for two screens and a camera are used to determine the relationship between coordinates in the frame attached to the first screen and coordinates in the reference frame attached to the second screen: the position of the camera with respect to the top screen, is represented by a rotation matrix $R_T$ and translation vector $T_T$, while $R_B$ and $T_B$ represent the position with respect to the bottom screen. Using this notation, the top-screen-to-bottom-screen transformation is represented by the rotation matrix:

$$R_c = R_T^T R_B$$

and translation vector $$T_c = R_T^T (T_B - T_T)$$

In some embodiments, more accurate estimates are produced of $R_c$ and $T_c$ from a plurality of available $R_{Ti}$, $T_{Ti}$, $R_{Bi}$ and $T_{Bi}$, (where i is an index number) obtained for example from many images and possibly many camera poses. To obtain more accurate estimates of $R_c$ and $T_c$, an appropriate averaging procedure is used: if we have obtained many estimated $R_{Ci}$ and $T_{ci}$ using the previous formulas, then the matrix $R_C$ is taken to be the average of the matrices $R_{Ci}$, projected orthogonally onto the space of rotation matrices, i.e., $R_C$ is the rotation matrix that is closest for the metric defined by the Frobenius norm, to the average of the matrices $R_{Ci}$. The translation $T_c$ is taken to be the average of the available $T_{ci}$.

In various embodiments, other procedures could be considered, including solving a least-squares reprojection problem where $R_c$ and $T_c$ appear as parameters of the optimization problem. and the bottom-screen-to-camera transformations are defined by $R_{Bi} = R_{Ti} R_C$ and $T_{Bi} = T_{Ti} + R_{Ti} T_C$. In this way, $R_c$ and $T_c$ are obtained directly from the process of solving the reprojection problem.

Once the relative positions of the screens are calculated, or once the coordinates of fiducials on the screens are calculated in a common reference frame, calibration of one or more camera(s) proceeds.

Figure 21:
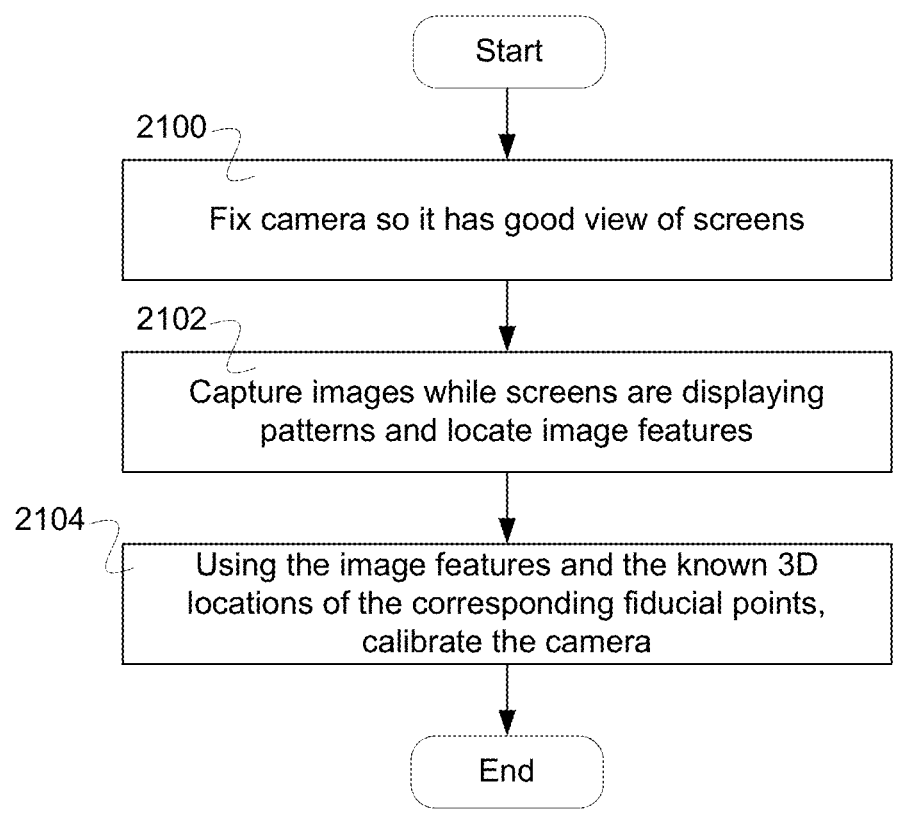
FIG. 21 is a flow diagram illustrating an embodiment of a process for using the apparatus to calibrate a camera.

FIG. 21 is a flow diagram illustrating an embodiment of a process for using the apparatus to calibrate a camera. In the example shown, in order to calibrate a (new) camera, the following steps are performed:
Fix camera so it has a good view of screens (2100),
Capture images while screens are displaying patterns and locate features (2102),
Using the image features and the known 3D locations of the corresponding fiducial points, calibrate the camera (2104).

Figure 22:
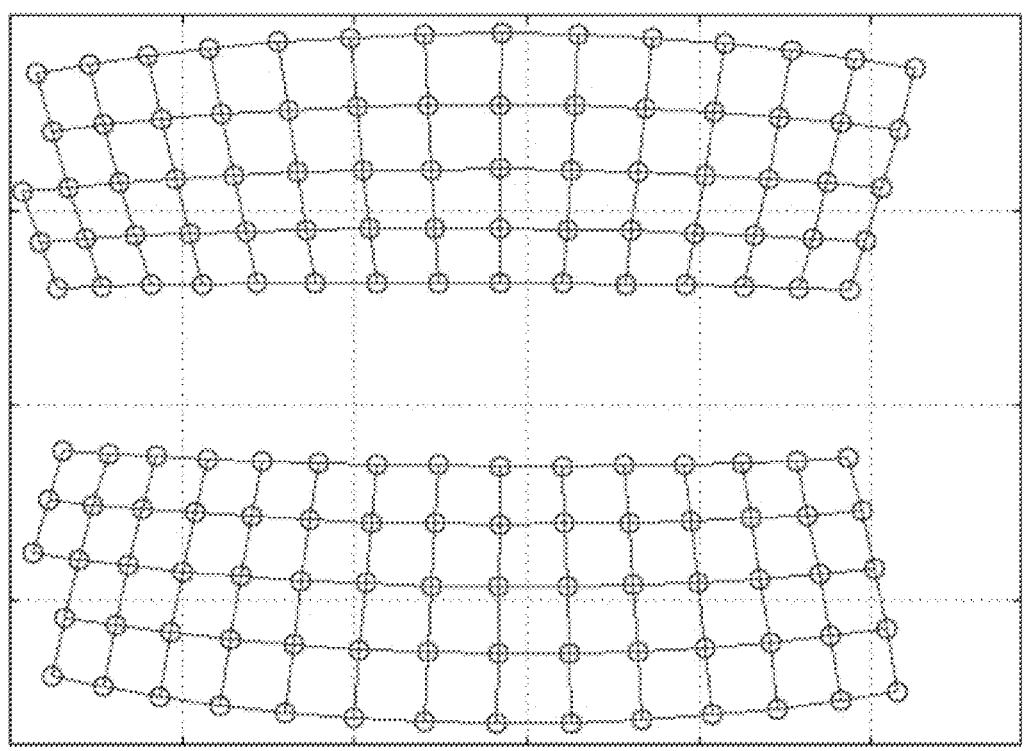
FIG. 22 is a graph illustrating an embodiment of projections of a set of non-planar calibration fiducial points.

FIG. 22 is a graph illustrating an embodiment of projections of a set of non-planar calibration fiducial points. In this example, features from the top and bottom screens, captured while the camera and screens were kept in a fixed position are shown.

Since the set of fiducial points is non-planar, knowing the fiducial points and their projections (i.e., the feature points) in a single image is sufficient to calibrate the camera. The camera is calibrated by finding the least-squares solution to the 3D reprojection problem with known 3D points in a single view.

Calibrating a stereo camera is disclosed. A stereo camera is calibrated using the same three steps used to calibrate a single camera: a) image processing is performed independently on the images produced by each of the two cameras, and b) the reprojection problem is solved under the constraint that the left and right camera poses are related by a fixed rigid transformation.

Figure 23A:
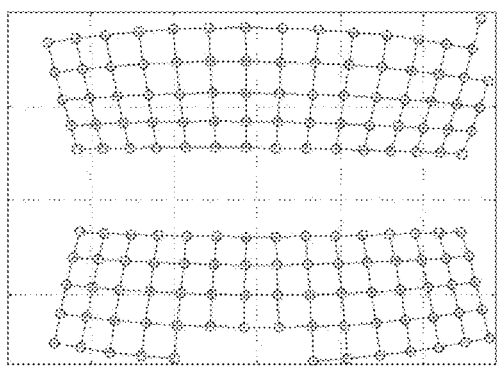
FIGS. 23A and 23B are images illustrating embodiments of features identified in the left and right cameras of a stereo camera.
Figure 23B:
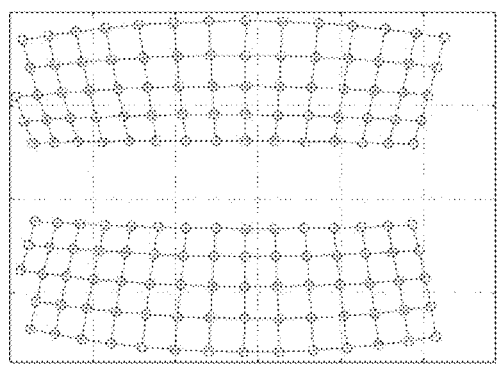

FIGS. 23A and 23B are images illustrating embodiments of features identified in the left and right cameras of a stereo camera. In the example shown, these features are used to calibrate a stereo camera. A camera model, for calibration of cameras, defines the relation between a 3D point, represented by the 3-vector X of its coordinates in a world reference frame (possibly the camera frame, or a reference frame attached to another object) and its 2D projected image in the camera, represented by the 2-vector x of its pixel coordinates. This relationship is represented by a function F:

$$x=F(X,R,T,f_x,f_y,c_x,c_y,k_1,k_2,k_3,k_4,k_5),$$

where R and T are the 3×3 rotation matrix and 3-vector representing the world-to-camera-coordinate transformation, $f_x$, $f_y$, are the x- and y-focal lengths of the camera, $c_x$, $c_y$, are the pixel coordinates of the principal point and $k_1, \ldots, k_5$ are parameters representing the lens distortion. These parameters are described in detail in computer vision textbooks. Variants of these calibration parameters can be used. The parameters $f_x$, $f_y$, $c_x$, $c_y$, $k_1$, $k_2$, $k_3$, $k_4$, $k_5$ are called the intrinsic parameters of the camera.

In the above equation, x is called the image, projection or reprojection of X, and X is a pre-image of x. Note that a given pixel location x typically has an infinity of pre-images: all points on a given half line emanating from the center of projection (a ray) project to the same 2D point.

Calibration by solving the reprojection problem is disclosed. Given a camera model and a set of 3D points and 2D observations in one or more images, the reprojection problem is solved by finding camera position(s) and calibration parameters such that the reprojections of the points, according to the camera model, match the given 2D observations.

In mathematical notation, we represent the set of fiducial points by the 3-vectors $X_n$ (n in 1, . . . , N, where N is the number of points). Calling M the number of distinct camera positions, where $x_{in}$ is the location in the image for the projection of $X_n$ in image i, for i in 1, . . . , M. Note that if some points are not visible for some camera positions, then the corresponding observation $x_{in}$ will be missing.

Solving the reprojection problem then means finding camera positions parameters $f_x$, $f_y$, $c_x$, $c_y$, $k_0$, $k_1$, $k_2$, $k_3$, $k_4$, $k_5$ and poses $R_i$, $T_i$, for i in 1, . . . , M, that verify $$x_{in}=F(X_n,R_i,T_i,f_x,f_y,c_x,c_y,k_1,k_2,k_3,k_4,k_5)$$

for all pairs (i, n) for which $x_{in}$ is available. In this form, solving the reprojection problem means solving a system of non-linear equations.

In practice, the equations are redundant (over-constrained) and the observations $x_{in}$ are corrupted by measurement noise, so that there exist no parameters that solve exactly the above equations. Thus, a search is performed for parameters that solve these equations approximately. Most commonly, the system of equations is solved in the least-squares sense: the sum of $$\|x_{in}-F(X_n,R_i,T_i,f_x,f_y,c_x,c_y,k_1,k_2,k_3,k_4,k_5)\|^2,$$

is minimized over all pairs (i, n) for which $x_{in}$ is available, where $\|.\|$ represents the 2-norm of a 2D vector. The reprojection problem is thus an optimization problem. One should note that the least-squares solution to the reprojection problem is the maximum likelihood estimate of the calibration parameters and camera poses, under the assumption of independent identically distributed Gaussian error terms in the observed values $x_{in}$.

The solution to this problem can be obtained using the Levenberg-Marquardt algorithm, using initial values provided by Zhang's method.

It is worth giving an overview of the factors that influence the quality of the estimated calibration: the accuracy of the least-squares estimator increases when
The error in the observations decreases. In a first-order approximation, the error in the estimator (covariance) is proportional to the error (variance) in the observations. It is thus important to localize features accurately.
The number of observations increases. This can be done either by:
increasing the number of features on the calibration target or,
increasing the number of calibration images. One downside of adding images is that each additional camera-target position adds 6 estimated parameters.
Calibration features occupy a wide area in the image. This is particularly important to accurately model lens distortion.

When calibrating a stereo camera, the calibration parameters for both cameras are determined, as well as the rigid transformation relating the right and left camera. The parameters of interest are:
the calibration parameters of the left camera: $f^L_x$, $f^L_y$, $c^L_x$, $c^L_y$, $k^L_1$, $k^L_2$, $k^L_3$, $k^L_4$, $K^L_5$ (the superscripts L and R denote left and right camera parameters, respectively).
the calibration parameters of the right camera: $f^R_x$, $f^R_y$, $c^R_x$, $c^R_y$, $k^R_1$, $k^R_2$, $k^R_3$, $k^R_4$, $K^R_5$,
the rigid transformation $R_S$, $T_S$ that relates the coordinate system of the right camera to the system of coordinates of the left camera.

As in the single-camera case, these parameters are estimated by using sets of observed projections of fiducial points. Features $x_{in}^L$ (like above, for some pairs (i,n), with i in 1, . . . , M, n in 1, . . . , N) are extracted from the images produced by the left camera and features $x_{in}^R$ from the images produced by the right camera.

Note that the requirements for calibrating a stereo camera differ from the requirements for calibrating two cameras independently: in the latter, the coordinates of the fiducial points $X_{in}^L$ and $X_{in}^R$ could be given in unrelated coordinate systems. This however would yield no information on the relative positions of the left and right cameras. In the case of a stereo camera, it is thus necessary that some 3D points be visible in the left and right images and be given in a common reference frame.

Solving the reprojection problem in the least-squares sense then comprises finding the calibration parameters, left camera positions $R_i^L$, $T_i^L$ and left-to-right transformation $R_S$, $T_S$, that minimize the sum of $$\|x_{in}^L - F(X_m, R_i^L, T_i^L, f_x^L, f_y^L, c_x^L, c_y^L, k_1^L, k_2^L, k_3^L, k_4^L, k_5^L)\|^2,$$

and of $$\|x_{jm}^R - F(X_m, R_S^T R_j, R_S^T(T_j - T_S), f_x^R, f_y^R, c_x^R, c_y^R, k_1^R, k_2^R, k_3^R, k_4^R, k_5^R)\|^2,$$

over all pairs (i, n) for which $x_{in}^L$ is available and over all pairs (j, m) for which $X_{im}^R$ is available. Here, only the world-to-left-camera transformations $R_i^L$, $T_i^L$ and right-to-left-camera transformation $R_S$, $T_S$ are estimated, because the world-to-right-camera transformations, $R_R = R_S^T R_i$, $T_R = R_S^T(T_j - T_S)$, are unambiguously defined from the former.

Figure 24:
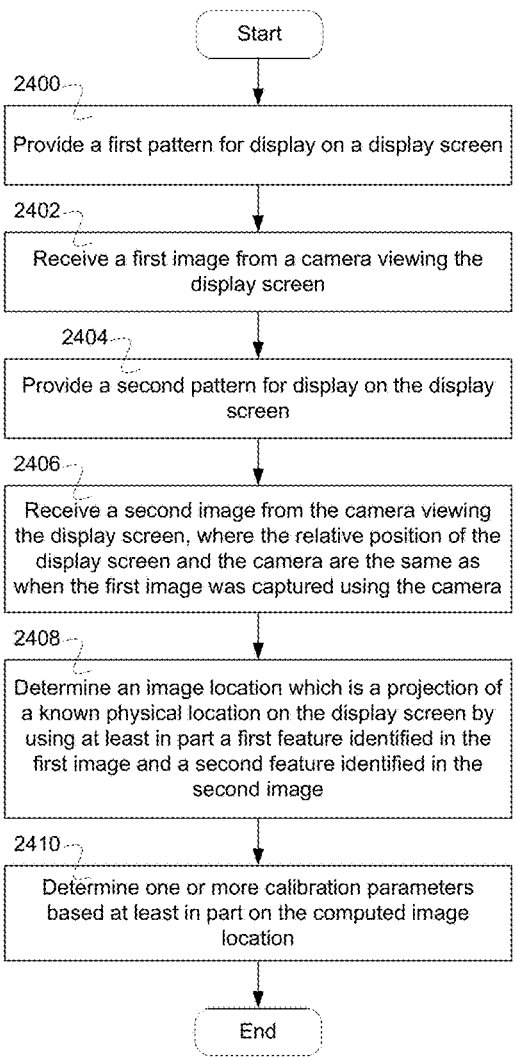
FIG. 24 is a flow diagram illustrating an embodiment of a process for determining one or more camera calibration parameters.

FIG. 24 is a flow diagram illustrating an embodiment of a process for determining one or more camera calibration parameters. In the example shown, in 2400 a first pattern is provided for display on a display screen. In 2402, a first image is received from a camera viewing the display screen. In 2404, a second pattern is provided for display on the display screen. In 2406, a second image is received from the camera viewing the display screen. The relative position of the display screen and the camera are the same as when the first image was captured using the camera. In 2408, one or more calibration parameters is/are determined based at least in part on the computed image location. In 2410, one or more calibration parameters is/are determined based at least in part on the determined image location.

In some embodiments, the process is executed using a processor, where a memory coupled to the processor is configured to provide the processor with instructions.

Figure 25A:
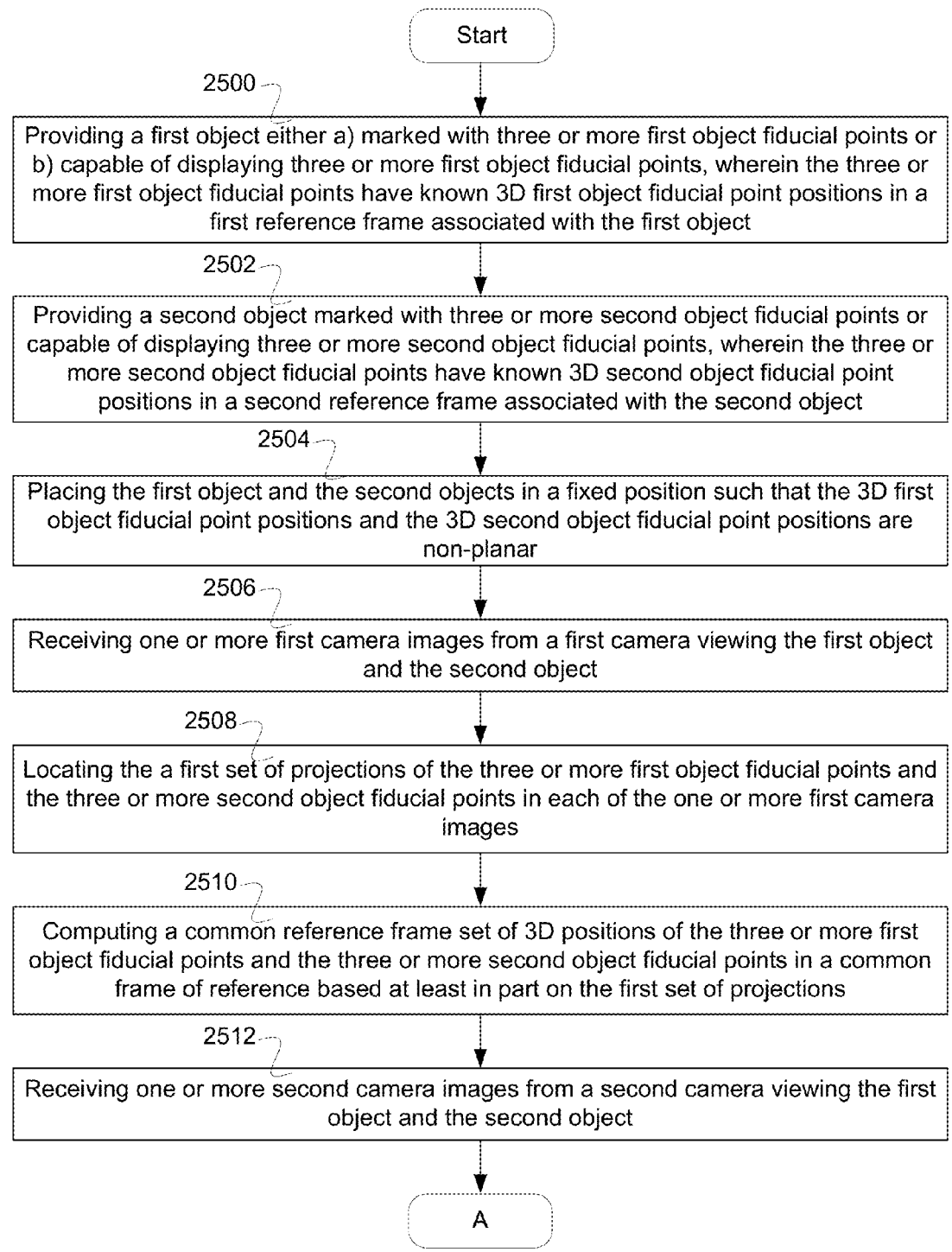
FIGS. 25A and 25B are a flow diagram illustrating an embodiment of a process for determining one or more calibration parameters.
Figure 25B:
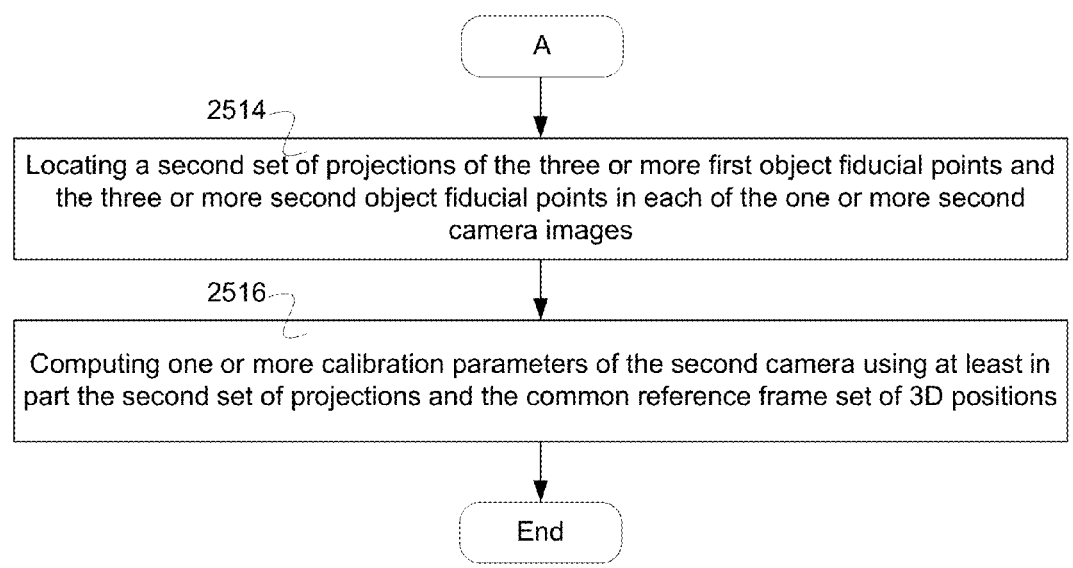

FIGS. 25A and 25B are a flow diagram illustrating an embodiment of a process for determining one or more calibration parameters. In the example shown, in 2500 a first object is provided either a) marked with three or more first object fiducial points or b) capable of displaying three or more first object fiducial points, wherein the three or more first object fiducial points have known 3D first object fiducial point positions in a first reference frame associated with the first object. In 2502, a second object is provided marked with three or more second object fiducial points or capable of displaying three or more second object fiducial points, wherein the three or more second object fiducial points have known 3D second object fiducial point positions in a second reference frame associated with the second object. In 2504, the first object and the second object are placed in a fixed position such that the 3D first object fiducial point positions and the 3D second object fiducial point positions are non-planar. In 2506, one or more first camera images is/are received from a first camera viewing the first object and the second object. In 2508, a first set of projections of the three or more first object fiducial points and the three or more second object fiducial points are located in each of the one or more first camera images. In 2510, the set of 3D positions in a common frame of reference of the three or more first object fiducial points and the three or more second object fiducial points are computed based at least in part on the first set of projections. In 2512, receive one or more second camera images from a second camera viewing the first object and the second object. In 2514, a second set of projections of the three or more first object fiducial points and the three or more second object fiducial points are located in each of the one or more second camera images. In 2516, one or more calibration parameters of the second camera is/are computed using at least in part the second set of projections and set of 3D positions of fiducials in the common frame of reference.

In some embodiments, the process is executed using a processor, where a memory coupled to the processor is configured to provide the processor with instructions. In various embodiments, the first object and the second object are planar, are computer display screens, are LCD displays, are planar and form an angle between 30 and 150 degrees (e.g., 90 degrees), or any other appropriate characteristics for the first object and the second object. In various embodiments, a first object fiducial or a second object fiducial comprises a point, a cross, a disc, an intersection (e.g., an intersection between squares of a checkerboard pattern), or any other appropriate fiducial.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining one or more camera calibration parameters, comprising:
   a processor configured to:
   display a first calibration pattern including a first number of parallel lines extending in a first direction;
   capture an image of said first calibration pattern;
   extract said first number of curves from said image;
   shift the calibration pattern in the second direction transverse to the length of said first number of parallel lines;
   display a second calibration pattern including a second number of lines extending parallel to one another in said second direction;
   capture an image of said second calibration pattern;
   extract said second number of curves from said image; and
   shift the calibration pattern in said first direction.

2. A system as in claim 1, said processor to determine a distortion parameter.

3. A system as in claim 1, said processor to determine comprises a principal point.

4. A system as in claim 1, said processor to determine a camera focal length.

5. A system as in claim 1, wherein the first calibration pattern comprises a set of horizontal ridges and a first feature comprises one or more locations along a portion of the first image corresponding to one horizontal ridge of the set of horizontal ridges.

6. A system as in claim 1, wherein the second calibration pattern comprises a set of vertical ridges and a second feature comprises one or more locations along a portion of the second image corresponding to one vertical ridge of the set of vertical ridges.

7. A system as in claim 1, wherein the first calibration pattern comprises a set of horizontal ridges and a first feature comprises one or more locations along a portion of the first image corresponding to one horizontal ridge of the set of horizontal ridges, and wherein the second pattern comprises a set of vertical ridges and a second feature comprises one or more locations along a portion of the second image corresponding to one vertical ridge of the set of vertical ridges, and wherein an image location comprises a point associated with an intersection of the first feature and the second feature.

8. A system as in claim 1, wherein the first calibration pattern comprises a first curve and a first feature comprises one or more locations in the first image corresponding to the first curve, and wherein the second calibration pattern comprises a second curve and a second feature comprises one or more locations in the second image corresponding to the second curve, and wherein an image location comprises a point associated with an intersection of the first curve and the second curve.

9. A system as in claim 1, wherein the first calibration pattern or the second calibration pattern comprises high contrast bands.

10. A system as in claim 1, wherein the first calibration pattern or the second calibration pattern comprises a disk.

11. A system as in claim 1, wherein the first calibration pattern or the second calibration pattern comprises a dot pattern.

12. A system as in claim 1, wherein the first calibration pattern or the second calibration pattern comprises a line pattern.

13. A system as in claim 1, wherein the first calibration pattern or the second calibration pattern comprises a ridge pattern.

14. A system as in claim 1, wherein one or more additional display screens are used to display additional pairs of patterns and wherein the image locations of the projections of known positions on the additional display screens are determined and wherein calibration parameters are determined based in part on the additional image locations.

15. A method for determining one or more camera calibration parameters, comprising:
 displaying a first calibration pattern including a first number of parallel lines extending in a first direction;
 capturing an image of said first calibration pattern;
 extracting said first number of curves from said image;
 shifting the calibration pattern in the second direction transverse to the length of said first number of parallel lines;
 displaying a second calibration pattern including a second number of lines extending parallel to one another in said second direction;
 capturing an image of said second calibration pattern;
 extracting said second number of curves from said image; and
 shifting the calibration pattern in said first direction.

16. A computer program product for one or more camera calibration parameters, the computer program product being embodied in a non-transitory computer readable storage medium and comprising computer instructions for:
 displaying a first calibration pattern including a first number of parallel lines extending in a first direction;
 capturing an image of said first calibration pattern;
 extracting said first number of curves from said image;
 shifting the calibration pattern in the second direction transverse to the length of said first number of parallel lines;
 displaying a second calibration pattern including a second number of lines extending parallel to one another in said second direction;
 capturing an image of said second calibration pattern;
 extracting said second number of curves from said image; and
 shifting the calibration pattern in said first direction.

17. A medium as in claim 16, said medium to determine a distortion parameter.

18. A medium as in claim 16, said medium to determine a principal point.

19. A medium as in claim 16, said medium to determine a camera focal length.

20. A medium as in claim 16, wherein the first calibration pattern comprises a set of horizontal ridges and a first feature comprises one or more locations along a portion of the first image corresponding to one horizontal ridge of the set of horizontal ridges.

21. A medium as in claim 16, wherein the second calibration pattern comprises a set of vertical ridges and a second feature comprises one or more locations along a portion of the second image corresponding to one vertical ridge of the set of vertical ridges.

22. A medium as in claim 16, wherein the first calibration pattern comprises a set of horizontal ridges and a first feature comprises one or more locations along a portion of the first image corresponding to one horizontal ridge of the set of horizontal ridges, and wherein the second pattern comprises a set of vertical ridges and a second feature comprises one or more locations along a portion of the second image corresponding to one vertical ridge of the set of vertical ridges, and wherein an image location comprises a point associated with an intersection of the first feature and the second feature.

23. A method as in claim 15, wherein the first calibration pattern comprises a set of horizontal ridges and a first feature comprises one or more locations along a portion of the first image corresponding to one horizontal ridge of the set of horizontal ridges.

24. A method as in claim 15, wherein the second calibration pattern comprises a set of vertical ridges and a second feature comprises one or more locations along a portion of the second image corresponding to one vertical ridge of the set of vertical ridges.

25. A method as in claim 15, wherein the first calibration pattern comprises a set of horizontal ridges and a first feature comprises one or more locations along a portion of the first image corresponding to one horizontal ridge of the set of horizontal ridges, and wherein the second pattern comprises a set of vertical ridges and a second feature comprises one or more locations along a portion of the second image corresponding to one vertical ridge of the set of vertical ridges, and wherein an image location comprises a point associated with an intersection of the first feature and the second feature.

* * * * *

UNITED STATES PATENT AND TRADEMARK OFFICE
CERTIFICATE OF CORRECTION

PATENT NO.         : 8,743,214 B2                          Page 1 of 1
APPLICATION NO.    : 13/105226
DATED              : June 3, 2014
INVENTOR(S)        : Etienne Grossmann et al.

It is certified that error appears in the above-identified patent and that said Letters Patent is hereby corrected as shown below:

In the Claims:

Col. 20:
Line 45, delete "comprises"

Signed and Sealed this
Twenty-sixth Day of August, 2014

Michelle K. Lee
*Deputy Director of the United States Patent and Trademark Office*